United States Patent
Bains et al.

(10) Patent No.: US 12,181,966 B2
(45) Date of Patent: Dec. 31, 2024

(54) REDUCTION OF LATENCY IMPACT OF ON-DIE ERROR CHECKING AND CORRECTION (ECC)

(71) Applicant: Intel Corporation, Santa Clara, CA (US)

(72) Inventors: Kuljit S. Bains, Olympia, WA (US); Narasimha Lanka, Dublin, CA (US)

(73) Assignee: Intel Corporation, Santa Clara, CA (US)

(*) Notice: Subject to any disclaimer, the term of this patent is extended or adjusted under 35 U.S.C. 154(b) by 753 days.

(21) Appl. No.: 17/225,777

(22) Filed: Apr. 8, 2021

(65) Prior Publication Data

US 2021/0224155 A1    Jul. 22, 2021

(51) Int. Cl.
*G06F 11/10* (2006.01)
*G06F 11/07* (2006.01)
*G06F 11/30* (2006.01)

(52) U.S. Cl.
CPC ...... *G06F 11/1068* (2013.01); *G06F 11/0772* (2013.01); *G06F 11/0784* (2013.01); *G06F 11/0787* (2013.01); *G06F 11/1048* (2013.01); *G06F 11/106* (2013.01); *G06F 11/3037* (2013.01)

(58) Field of Classification Search
CPC ............ G06F 11/1068; G06F 11/0772; G06F 11/0784; G06F 11/0787; G06F 11/1048; G06F 11/106; G06F 11/3037
USPC ......................... 714/764, 763, 718, 711, 154
See application file for complete search history.

(56) References Cited

U.S. PATENT DOCUMENTS

| | | | |
|---|---|---|---|
| 5,771,247 A * | 6/1998 | Allen | G06F 11/1044 714/763 |
| 9,811,420 B2 | 11/2017 | Das et al. | |
| 9,817,714 B2 | 11/2017 | Halbert et al. | |
| 10,496,473 B2 | 12/2019 | Das et al. | |
| 10,872,011 B2 | 12/2020 | Bains et al. | |
| 11,314,589 B2 * | 4/2022 | Bains | G06F 11/1052 |
| 11,720,258 B2 * | 8/2023 | Ballapuram | G06F 3/0673 711/154 |
| 11,966,286 B2 * | 4/2024 | Bains | G06F 11/1072 |
| 2002/0174392 A1 * | 11/2002 | Chang | G11C 8/12 714/718 |
| 2009/0307523 A1 | 12/2009 | Allison et al. | |
| 2013/0179751 A1 | 7/2013 | Linstadt | |
| 2016/0283318 A1 | 9/2016 | Das et al. | |
| 2017/0125128 A1 | 5/2017 | Lee et al. | |
| 2018/0024878 A1 * | 1/2018 | Das | G06F 11/1048 714/764 |

(Continued)

OTHER PUBLICATIONS

International Search Report and Written Opinion for PCT Patent Application No. PCT/US22/19202, Mailed Jun. 14, 2022, 11 pages.

*Primary Examiner* — John J Tabone, Jr.
(74) *Attorney, Agent, or Firm* — Compass IP Law PC

(57) ABSTRACT

A memory device having on-die error checking and correction (ECC) circuitry can provide uncorrected data in response to a read command. The ECC circuitry can perform error correction for errors detected, generating the corrected data in parallel with providing the uncorrected data. The memory device stores the corrected data internally to the memory device. When an error is detected, the memory device provides an indication to the memory controller, which can then request the corrected data.

18 Claims, 12 Drawing Sheets

(56) References Cited

U.S. PATENT DOCUMENTS

| | | | |
|---|---|---|---|
| 2019/0221273 A1 | 7/2019 | Parkinson et al. | |
| 2019/0347158 A1* | 11/2019 | Chung | G06F 11/1044 |
| 2020/0133769 A1 | 4/2020 | Bains | |
| 2020/0278906 A1* | 9/2020 | Bains | G06F 11/1052 |
| 2020/0371873 A1* | 11/2020 | Schaefer | G11C 11/2275 |
| 2020/0401476 A1* | 12/2020 | Cha | G06F 11/106 |
| 2021/0224155 A1* | 7/2021 | Bains | G06F 11/0772 |
| 2022/0004324 A1* | 1/2022 | Ballapuram | G06F 3/0655 |
| 2022/0050745 A1* | 2/2022 | Eno | G06F 11/1068 |
| 2022/0108762 A1* | 4/2022 | Jang | G11C 7/1057 |
| 2022/0229724 A1* | 7/2022 | Bains | G06F 11/1072 |

\* cited by examiner

| | INDICATION | PIN | BURST POSITION | | | | | | | |
|---|---|---|---|---|---|---|---|---|---|---|
| | | | 0 | 1 | 2 | 3 | 4 | 5 | 6 | 7 |
| 412 | NE | SEV[0] | 0 | 0 | 0 | 0 | 0 | 0 | 0 | 0 |
| 414 | | SEV[1] | 0 | 0 | 0 | 0 | 0 | 0 | 0 | 0 |
| 422 | CEs | SEV[0] | 0 | 0 | 0 | 0 | 1 | 1 | 1 | 1 |
| 424 | | SEV[1] | 0 | 0 | 0 | 0 | 0 | 0 | 0 | 0 |
| 432 | CEm | SEV[0] | 0 | 0 | 0 | 0 | 0 | 0 | 0 | 0 |
| 434 | | SEV[1] | 0 | 0 | 0 | 0 | 1 | 1 | 1 | 1 |
| 442 | UE | SEV[0] | 0 | 0 | 0 | 0 | 1 | 1 | 1 | 1 |
| 444 | | SEV[1] | 0 | 0 | 0 | 0 | 1 | 1 | 1 | 1 |
| 452 | CENC | SEV[0] | 1 | 1 | 1 | 1 | 0 | 0 | 0 | 0 |
| 454 | | SEV[1] | 1 | 1 | 1 | 1 | 0 | 0 | 0 | 0 |

FIG. 4

REDUCTION OF LATENCY IMPACT OF ON-DIE ERROR CHECKING AND CORRECTION (ECC)

FIELD

Descriptions are generally related to memory systems, and more particular descriptions are related to on die error checking and correction (ECC).

BACKGROUND

Increasing memory device density and operating speeds, coupled with smaller feature size for switching and storage elements in memory devices, have tended to increases in runtime errors for memory devices. Memory systems employ error checking and correction (ECC) to correct errors that could otherwise cause system faults. The memory controller of the host applies ECC to data received from the memory devices that are coupled in parallel to the memory bus. The memory devices such as DRAM (dynamic random access memory) devices increasingly employ on-die ECC to reduce errors in the data sent to the host.

Complex coding schemes such as Reed-Solomon codes are typically used in on-die ECC to reduce the number of required check bits and to maximize the correction capability for a data word. However, such coding schemes add latency for error correction for every data access by the host. Thus, the on-die ECC latency can impact system performance by extending the time it takes for the host to retrieve data from system memory.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 4 is an example of a table of error detection indicators.

Figure 1:
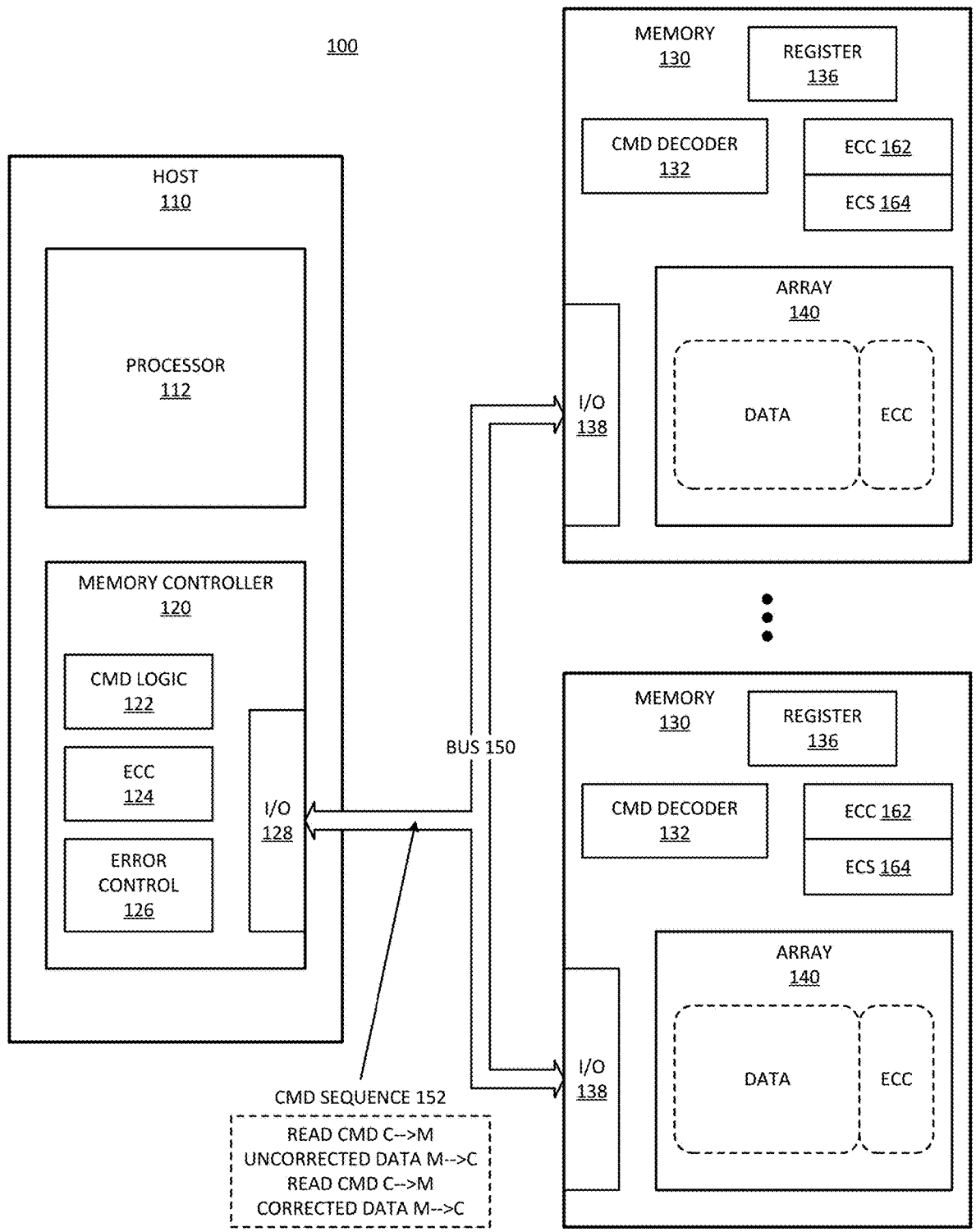
FIG. 1 is a block diagram of an example of a system in which a memory device performs on-die ECC and provides corrected data only when an error is detected.

Descriptions of certain details and implementations follow, including non-limiting descriptions of the figures, which may depict some or all examples, and well as other potential implementations.

DETAILED DESCRIPTION

As described herein, a memory device having on-die error checking and correction (ECC) circuitry can provide uncorrected data in response to a read command. Although error rates are increasing in memory devices, errors are the exception rather than the rule. For most read transactions, the on-die ECC detects no error. If there is no error detected, error correction is unnecessary, and the latency associated with error correction is unnecessary. In one example, on-die ECC has parallel paths for data correction and non-correction. With the parallel paths, the memory device can default to sending data without error correction, and perform error correction to store data for subsequent access by the host if an error is detected.

Thus, the ECC circuitry can perform error detection on all reads, and perform error correction for errors detected, generating the corrected data in parallel with providing the uncorrected data to the host. The memory device stores the corrected data internally. The memory device provides an indication of error or no error to the memory controller. The memory controller can subsequently request the corrected data when there is an indication of error.

In one example, the path of uncorrected data is a selectable bypass data path which does not incur an error correction latency penalty. In one example, the error checking indicates a severity of detected error to the host through metadata bits or error reporting metadata. In one example, the metadata can include encoding to indicate a correctable but uncorrected error to indicate to the host when the uncorrected data has an error that has been detected at the memory device.

It will be understood that in the majority of cases, there will be a latency saving for a memory access, as the data will be accessed without error correction. In one example, based on the indication metadata, the memory controller can detect the need to take additional action while the memory device is correcting the data in parallel. In one example, the memory controller issues a read command for the corrected data when an error is indicated. When the memory controller issues a subsequent read command with a subsequent address for the corrected data, the data will be ready at the memory device by the time the memory controller issues the subsequent read command. In one example, the subsequent address is the same address as the first read command that resulted in an error. In one example, the subsequent address is an address to a location that stores the corrected data. In one example, the memory device can respond to the subsequent read command by providing the previously-corrected data, which will not incur the latency associated with error correction because the data was corrected in parallel with sending the uncorrected data and error indication to the memory controller.

FIG. 1 is a block diagram of an example of a system in which a memory device performs on-die ECC and provides corrected data only when an error is detected. System 100 represents elements of a computer system. System 100 can be considered to illustrate elements of a memory system, or memory subsystem if the memory system is considered a portion of the computer system.

System 100 includes host 110, which represents a hardware and software platform for the computer system that includes the memory. Host 110 includes processor 112, which can be any type of processor, microprocessor, central processing unit (CPU), graphics processing unit (GPU), or other controller or processor that executes instructions that result in requests for access to memory. Processor 112 can be a single core processor. In one example, processor 112 is a multicore processor.

Host 110 includes memory controller 120 to represent circuitry in host 110 to manage the access to memory 130. In one example, memory controller 120 is part of a processor die (integrated memory controller or on-die controller). In one example, memory controller 120 is circuitry integrated onto a system on a chip (SOC) that includes processor 112 and memory controller 120. Such an SOC could also include peripheral controllers, communication controllers, graphics controllers, or other circuitry.

In one example, memory controller 120 includes command (CMD) logic 122, which represents logic to generate commands to memory 130 in response to a request by processor 112 for memory access. Command logic 122 can include circuitry on memory controller 120 as well as firmware or code logic. In one example, command logic 122 can generate a command to access uncorrected data from memory 130 in response to an error indication. In one example, the subsequent command can have a command encoding to indicate a read for uncorrected data. In one example, the subsequent command has the same read encoding to the same address as the command that resulted in the uncorrected data with the error. In one example, command (CMD) decoder 132 of memory 130 will interpret the subsequent command as a command for the corrected data. In one example, the subsequent command can be referred to as a retry command, to cause memory 130 to return corrected read data.

Memory controller 120 includes ECC 124, which represents error checking and correction logic at the host side. ECC 124 performs system-level ECC, which refers to error checking and correction for data received from multiple parallel devices of memory 130. In one example, ECC 124 includes circuitry to execute ECC operations on data received from memory 130. In one example, ECC 124 generates ECC check bits to send with write data for a write command.

Memory controller 120 includes I/O (input/output) 128, which represents hardware to interface with memory 130. The hardware can include pins, balls, or other connectors to interface with signal lines on a connecting substrate (e.g., an SOC or a motherboard) of system 100 that provides electrical interconnection of memory controller 120 with memory 130. The hardware of I/O 128 can include drivers and receive circuitry (including termination hardware, clock/timing circuits, signal phase control such as delay lock loops (DLL) or phase lock loops (PLL), or other hardware).

Memory 130 represents an individual memory device, such as a DRAM (dynamic random access memory) device or SDRAM (synchronous DRAM) device. In one example, memory 130 represents memory devices that are compliant with a double data rate (DDR) standard. System 100 illustrates multiple memory devices, each labeled as memory 130. Memory 130 includes I/O 138, which represents hardware or a hardware interface of the memory device to interface with and communicate with memory controller 120. Bus 150 represents one or more groups of signal lines or traces to electrically/communicatively connect memory 130 with memory controller 120. The hardware of I/O 138 can be the same or similar to I/O 128 of memory controller, and will not be described separately.

Memory 130 includes command (CMD) decoder 132, which represents circuit elements and logic to decode a command received from memory controller 120. A command can include a Read command, a Write command, a Refresh command, or other commands. In one example, command decoder 132 includes logic to decode a retry command or subsequent command as a request for corrected data.

Memory 130 includes array 140 to store data. Array 140 represents an array of addressable memory locations. Typically, array 140 is addressable at least by row (e.g., wordline) and column (e.g., bitline). Array 140 can be subdivided into various banks or sub-banks, or other divisions. Array 140 stores data and ECC data. It will be understood that data can include data written from memory controller 120. In one example, some or all of the data written by memory controller 120 to a selected memory device can be system ECC data. ECC within array 140 represents local ECC data or ECC check bits generated by ECC 162 for internal ECC.

Memory 130 includes ECC 162, which represents on-die ECC or on device ECC. ECC 162 operates within memory 130 to correct data errors for data before memory 130 provides the data to memory controller 120. The operation of ECC 162 of memory 130 will be understood to be different from the operation of ECC 124 of memory controller 120. Memory controller 120 computes ECC and sends check bits that can be stored in one or more of the multiple memory devices. Some of the memory devices will store only data, and other may store only ECC check bits. For example, common architectures includes 10×4, or 10 memory devices with 8 to store data and 2 to store ECC information, where the memory devices have a ×4 data interface. Adding more devices for ECC adds cost with increased parts, as well as increasing the channel pinout for additional signal lines to connect to the additional device(s).

In one example, memory 130 represents multiple memory dies of a memory module, such as a dual inline memory module (DIMM). In one example, memory 130 represents multiple memory dies of a multichip package such as an HBM (high bandwidth memory) package. The parallel memory dies or memory devices can operate in parallel to provide a portion of a code word for an access command from memory controller 120.

ECC 124 performs ECC for all data bits sent in total to all the memory devices. ECC 162 operates within memory 130 to check and correct errors within the memory device prior to returning the portion of bits stored in the memory device. It will be understood that the RAS (reliability, accessibility, and serviceability) performance of the system-level ECC is expected to be higher than that of ECC within an individual device due to the availability of more ECC information.

In one example, ECC 162 has an error correct bypass path. Thus, ECC 162 can be considered to have separate error detection and error correction portions. The error detection or error checking portion of ECC 162 can perform error checking for all first read commands. A read command that is not a subsequent command for corrected data can be considered a first read command. In one example, ECC 162 performs error correction for all first read commands but returns uncorrected data with an error detection indicator while the error correction starts. ECC 162 can store the corrected data in a buffer or storage location on memory 130 for subsequent access by memory controller 120.

Memory 130 includes register 136, which represents a configuration register of memory 130. For example, register 136 can be a mode register. Register 136 includes one or more fields to store configuration information for memory 130. In one example, register 136 represents a storage location for the corrected data from ECC 162. In one example, ECC 162 stores the corrected data in a dedicated storage location of array 140. In one example, memory 130 includes a storage device or buffer to store the corrected data for subsequent access.

Bus 150 provides electrical and communicative connection between memory controller 120 and memory 130. The dashed box pointing to bus 150 illustrates one example of a command (CMD) sequence 152. Command sequence 152 will be understood as one nonlimiting example of a command sequence where a retry command is used.

In one example, a Read command (READ CMD) is sent from memory controller 120 to memory 130 (controller to memory, or C→M). In response to the Read command, memory 130 accesses data from array 140 and provides it to ECC 162. Thus, ECC 162 can receive read data from an address specified in the read command in response to the read command. ECC 162 can apply error checking and return uncorrected data with an error indication to memory controller 120 (memory to controller, or M→C). The error indication indicates errors detected in the read data.

Memory controller 120 issue a subsequent read command (READ CMD) to memory 130 for the corrected data. In one example, the subsequent command refers to another read command having the same address as the immediately preceding read command. Thus, an identical command can indicate that the memory controller wants the corrected data. In response to the subsequent read command, memory 130 can provide the corrected data to memory controller 120.

In one example, the "corrected" data simply refers to data on which ECC 162 has performed error correction. Corrected data in this sense does not necessarily mean the data is free from errors. For example, ECC 162 can be effective at correcting SBEs (single bit errors), but could alias an additional bit error when data read from array 140 has an MBE (multibit error). Similarly, "uncorrected" data does not necessarily refer to data that has errors. Rather, uncorrected data refers to data to which ECC 162 has not performed error correction. Uncorrected data can be error free in the majority of instances.

In one example, memory controller 120 includes error control 126. In one example, error control 126 reads an error indication after a read command and determines whether subsequent processing is needed for the read command. In one example, when the error indication indicates an error was detected that was not corrected, error control 126 can cause command logic 122 to generate a subsequent read command to access the corrected data from memory 130.

In one example, memory 130 includes ECS (error checking and scrubbing) 164. ECS 164 represents a scrubbing engine for memory 130. In one example, ECS 164 works with ECC 162 to perform ECC to scrub the data of array 140. Typically, scrubbing is performed at set intervals of time, to scrub the addresses of array 140 over a scrub period (e.g., 24 hours). Scrubbing refers to reading data from array 140, performing ECC on the data, and writing corrected data back to the array. The scrubbing over the scrub period can be referred to as patrol scrubbing.

In one example, memory controller 120 can reduce recurring correction latency and retry buffer conflict caused by multiple detected errors where uncorrected data is returned. In one example, memory controller 120 reduces the recurring correction latency by reading the corrected data from the buffer and having command logic 122 issue a write command to the address where the uncorrected, correctable error was detected.

In one example, memory controller 120 reduces the recurring correction latency by issuing a special targeted scrub command to indicate to memory 130 to scrub the address and correct the data in the affected address. Such a targeted scrub command could be defined in command encoding for the command protocol for accessing memory 130. In one example, application of targeted scrubbing can allow that any additional read commands to the same address will receive correct data. In one example, memory controller 120 does not issue a subsequent read command for the corrected data until after issuing a targeted scrub command to correct the data and write it back to array 140. It will be understood that such an operation will have many timing constraints that will need to be respected to access the corrected data. Such a mechanism can provide flexibility to memory controller 120 to issue other commands to other addresses even when a correctable, uncorrected error is indicated.

In one example, host 110 through ECC 124 of memory controller 120 can SBE correction on data received from memory 130. With the ability to perform SBE correction on received read data, in one example, memory controller 120 can address a correctable, uncorrected error at the host without a need for a retry or subsequent read command.

It will be understood that data received from multiple memory devices in parallel can include an SBE for data from one device. SBEs from multiple parallel devices for the same address will result in data returned that has an MBE. In one example, when the returned data has an SBE, memory controller 120 does not issue a subsequent read command to access the corrected read data from the memory device, but instead corrects the SBE at host 110. In one example, only when the received data has an MBE does memory controller 120 issue a subsequent read command. A subsequent read command can access corrected data from multiple memory devices, which could address the MBE. In one example, memory controller 120 issues the subsequent read command when multiple memory devices provide indications of correctable, uncorrected errors.

Figure 2:
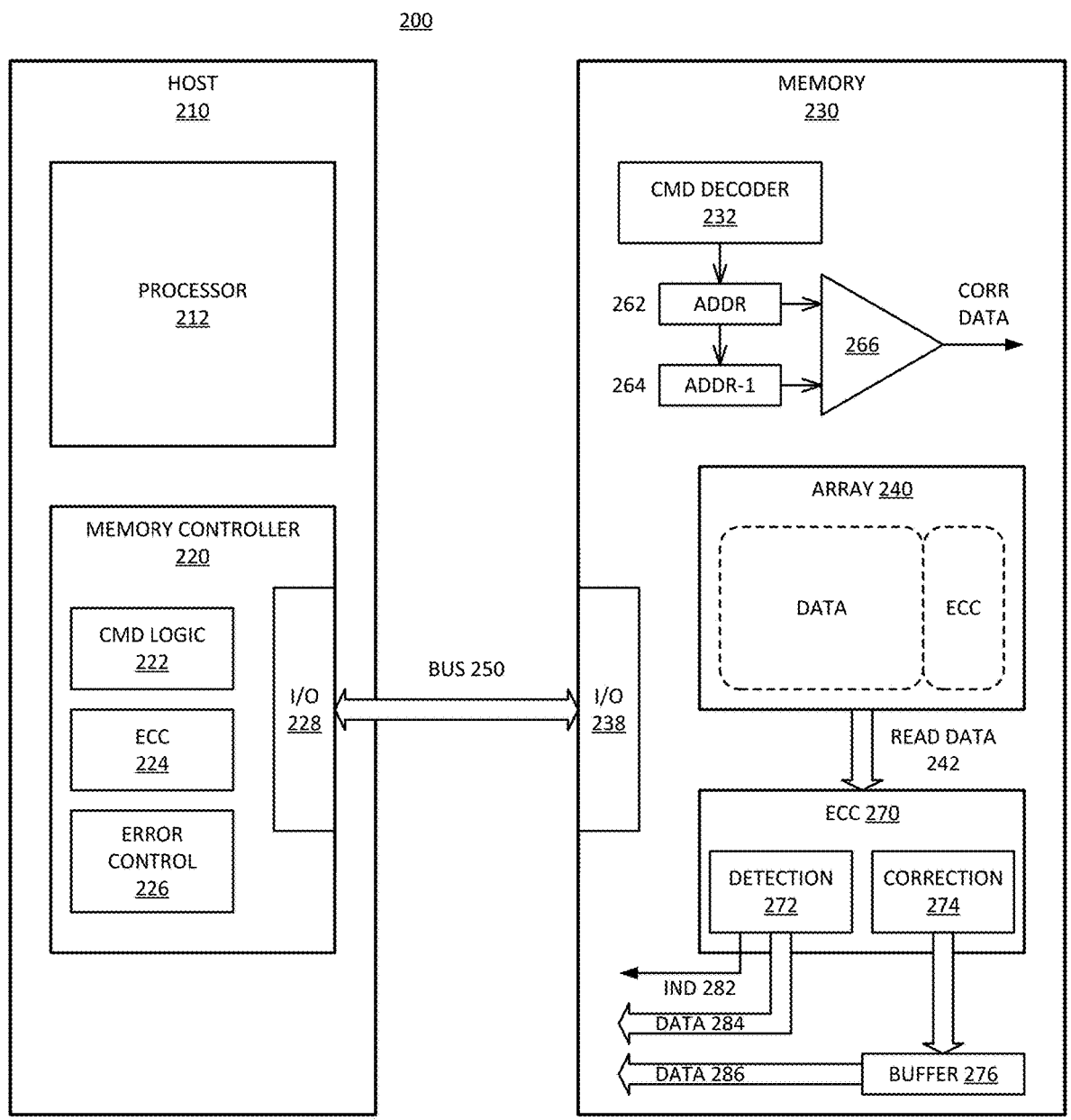
FIG. 2 is a block diagram of an example of a system in which a host selectively provides a command to request data processed with on-die error correction.

FIG. 2 is a block diagram of an example of a system in which a host selectively provides a command to request data processed with on-die error correction. System 200 provides an example of a system in accordance with system 100 of FIG. 1. System 200 more specifically illustrates an architecture for a subsequent read command or a retry command indicated by a sequence of repeated read commands. Only one memory device is illustrated for simplicity, but it will be understood that more than one memory device can be used, and a typical implementation will include multiple memory devices in parallel.

Host 210 represents a host platform for system 200. Host 210 includes processor 212 and memory controller 220. The descriptions above with respect to processor 112 of system 100 can also apply to processor 212 of host 210. The descriptions above with respect to memory controller 120, ECC 124, error control 126, and I/O 128 of system 100 can also apply to memory controller 220, ECC 224, error control 226, and I/O 228 of system 200, respectively.

The descriptions above with respect to memory 130, command decoder 132, I/O 138, and array 140 of system 100 can also apply to memory 230, command (CMD) decoder 232, I/O 238, and array 240, respectively. Similarly, the descriptions of bus 150 above can apply to bus 250.

With respect to command (CMD) logic 222, command logic 222 issues a retry command by issuing back to back read commands to the same address. While a command sequence on bus 250 is not specifically illustrated, an example of the command sequence described with respect to bus 150 can apply for bus 250. The subsequent read command in the sequence can more specifically be a read command triggered by repetition of a sequence of read commands to the same address for system 200.

In one example, memory 230 includes address registers or other storage elements to store address data for read commands. In one example, when command decoder 232 detects a read command, the decoder triggers memory 230 to store the address of the read command (ADDR) in register 262. Memory 230 can compare the address of register 262 with a prior read address (ADDR-1) in register 264. Comparator 266 can determine if the addresses are the same and issue a corrected data output in response to the comparison. The corrected data indication can indicate to memory 230 to return the corrected data (CORR DATA) for the address of the previous read command.

In one example, the comparison occurs only in response to consecutive read commands. Thus, for example, the operation of comparator 266 can be enabled (or gated) based on another comparison that the current command is the same as the prior command. In one example, the circuitry of memory 230 stores the address of every access command in register 262, and on the next access command pushes the address to register 264 to be replaced with the address of the next access command. In such an implementation, memory 230 can include additional circuitry to control subsequent read decoding, such as gating the corrected data output with a determination that the command is a read command, or that the command is a read command and the prior command was also a read command (e.g., an indication that two read commands were received back-to-back). Such logic can be gated with the output, or used by circuitry within comparator 266 to generate the read retry encoding output.

Similar or additional logic can be added to ensure that no intervening commands were received. For example, memory 230 can include circuitry to ensure that the decoding of consecutive commands only results in a read retry when there are no intervening commands received between the two read commands, such as a current command and a subsequent read command, which could alternatively be considered a current read command and a prior read command. When referring to intervening commands, it will be understood that a read command followed by a CAS command can be considered one read command. Thus, the CAS command would not be considered an intervening command for purposes of the comparison when the CAS command is part of the sequence of triggering the execution of a read operation.

Thus, in one example, memory 230 compares a read command address to a previous read command address. If the read command addresses match, in one example, memory 230 can access corrected data from a storage location and return it to memory controller 220.

ECC 270 represents the ECC circuitry of memory 230. System 200 illustrates more detail for ECC 270. ECC 270 receives read data 242 from array 240 in response to a read command that reads data from the array. In one example, ECC 270 includes error detection 272 and error correction 274 as parallel paths. In one example, detection 272 provides error indication (IND) 282 to notify memory controller 220 of errors detected in read data 242. Error detection 272 can return data 284, which is the same as read data 242, because error correction has not been applied to the data.

In one example, memory 230 includes buffer 276, which represents a storage location in memory 230 to store corrected data from error correction 274. Data 286 represents the corrected data stored in buffer 276. In one example, memory 230 returns corrected data 286 in response to a subsequent read command from memory controller 220.

In one example, buffer 276 represents a retry buffer implemented on memory 230 to store corrected data 286. In one example, memory controller 220 issues a READ command to the same address as the original read command that resulted in error indication 282 indicating an error in data 284. In one example, buffer 276 represents a separately addressable storage location in memory 230, and memory controller 220 can issue a subsequent read command as a read to the addressable location. In one example, the addressable location represents a row or storage location of array 240. In one example, buffer 276 represents a register, such as a mode register or multipurpose register of memory 230. If buffer 276 is implemented as a register, in one example, command logic 222 issues the subsequent read command as a register read command (e.g., a mode register read (MRR)).

In one example, in response to error indication 282 indicating an error, command logic 222 issues a targeted scrub command to the previous address or the address of the previous read command. Such a targeted scrub command would allow memory 230 to write the corrected data back to array 240. In one example, in response to a targeted scrub command, memory 230 writes corrected data 286 back to array 240, as well as sending corrected data 286 to memory controller 220. In one example, memory controller 220 issues a targeted scrub command to memory 230 in response to an indication of correctable error, causing memory 230 to write the corrected data back to array 240. After the targeted scrub command, memory controller 220 can issue a subsequent read to the same address, which can read the data from array 240 and provide the data through the uncorrected data path of error detection 272. In one example, in response to a subsequent read command or retry command, memory 230 writes corrected data 286 back to array 240 as well as sending the data to memory controller 220.

An example of error indication 282 is described in more detail below with respect to table 400 of FIG. 4. In one example, error indication 282 includes an error indication encoding, which can be referred as indicating a severity of error detected in read data 242. In one example, the encoding includes an encoding for a correctable error, not corrected (CENC) to indicate that a correctable error (CE) was detected by ECC 270, but the data sent back did not have correction 274 applied.

In one example, when memory controller 220 through error control 226 receives a CENC indication for an address of a read command, command logic 222 can issue an additional read to the same address to access buffer 276. Memory 230 can service the additional read by providing corrected data 286 from buffer 276. In one example, correction 274 only writes data to buffer 276 when error indication 282 indicates a CENC. For example, the CENC encoding can act as a gating signal for enabling write to buffer 276.

Figure 3:
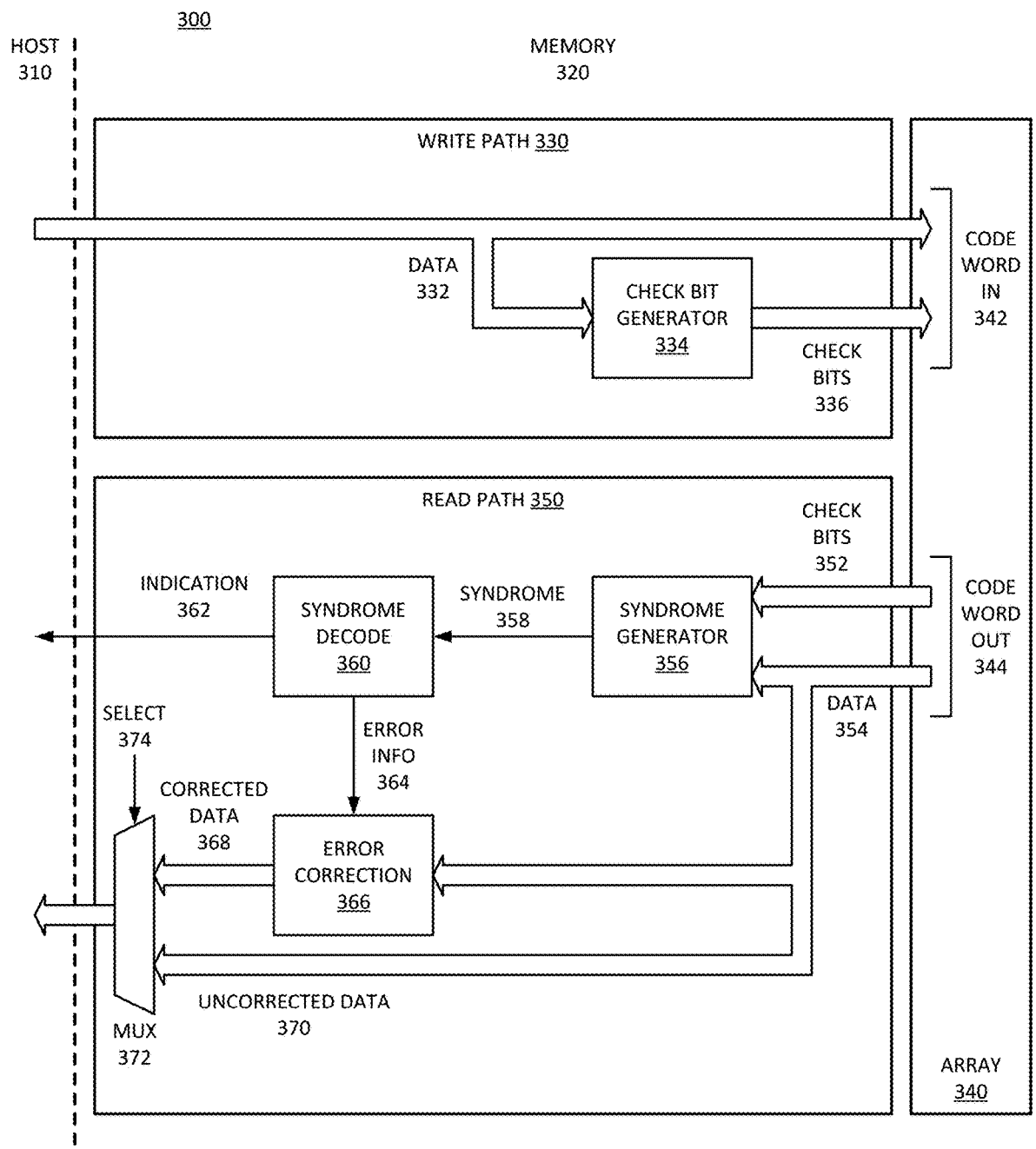
FIG. 3 is a block diagram of an example of an on-die error checking and correction (ECC) subsystem to implement selective sending of corrected data from on-die ECC.

FIG. 3 is a block diagram of an example of an on-die error checking and correction (ECC) subsystem to implement selective sending of corrected data from on-die ECC. System 300 provides an example of on-die ECC circuitry for a system in accordance with system 100 or system 200. Host 310 includes a memory controller or equivalent or alternative circuit or component that manages access to memory 320. Memory 320 implements on-die ECC to check and correct data prior to sending the data to host 310.

System 300 illustrates write path 330 in memory 320, which represents a path for data written from host 310 to memory 320. Host 310 provides data 332 to memory 320 for writing to memory array(s) 340. In one example, memory 320 generates check bits 336 with check bit generator 334 to store with the data in memory 320. Check bits 336 can be referred to as ECC bits, and enable host 310 to correct an error that might occur in the writing to and reading from the memory 320. Data 332 and check bits 336 can be included as code word in 342, which is written to the array 340.

Read path 350 represents a path for data read from memory 320 from array 340 to return to host 310. In one example, at least certain hardware components of write path 350 and read path 330 are the same hardware. In one example, memory 320 fetches code word out 344 in response to a Read command from host 310. The code word can include data 354 and check bits 352. Data 354 and check bits 352 can correspond, respectively, to data 332 and check bits 336 written in write path 330. Thus, a read can access data and ECC bits.

It will be understood that error correction in read path 350 can include the application of an XOR (exclusive OR) tree to a corresponding H matrix to detect errors and selectively correct errors (in the case of a single bit error). The structure of the XOR tree can be designed to implement the H matrix. As is understood in the art, an H matrix refers to a hamming code parity-check matrix that shows how linear combinations of digits of the codeword equal zero. Thus, the H matrix rows identify the coefficients of parity check equations that must be satisfied for a component or digit to be part of a codeword. In one example, memory 320 includes syndrome generator 356, which enables the memory to apply check bits 352 to data 354 to detect errors in the read data. Syndrome generator 356 can generate syndrome 358 for use in generating appropriate error information for the read data. Data 354 can also be forwarded to error correction 366 for correction of a detected error.

In one example, syndrome generator 356 passes syndrome 358 to syndrome decode 360 to generate an error vector. In one example, check bit generator 334 and syndrome decode 360 are fully specified by a corresponding H matrix for the memory device. In one example, if there are no errors in the read data (e.g., zero syndrome 358), syndrome decode 360 generates indication 362 as a no error signal. In one example, if there are multiple errors in the read data (e.g., non-zero syndrome 358 that does not match any of the columns in a corresponding H matrix), syndrome decode 360 generates indication 362 as a DUE (detected uncorrected error) signal, which indicates a detected, uncorrected error. The DUE signal can indicate a multibit error that memory 320 was not able to correct by internal ECC.

In one example, if there is a single bit error (e.g., non-zero syndrome 358 that matches one of the columns of a corresponding H matrix), syndrome decode 360 can generate indication 362 as a CE (correctable error) signal with error location, which is error information 364 provided to error correction logic 366. Error correction 366 can apply the correctable error to the specified location in data 354 to generate corrected data 368 for internal storage. Host 310 can read corrected data 368 with a subsequent read command. In one example, indication 362 can be considered an error vector that indicates a state of errors in the read data transmitted to host 310. Error info 364 can include the information of indication 362 as well as address or location information for performing the error correction. The vector can include multiple bits to indicate a severity of errors in data 354 or the read data.

In one example, read path 350 includes a path for uncorrected data 370. Mux 372 represents a multiplexer or selector to select between uncorrected data 370 and corrected data 368. Mux 372 can be controlled via select 374, which represents a selection signal apply to the ECC circuitry to provide a bypass path for uncorrected data. In one example, select 374 is generated by command decode logic of memory 320. In one example, the selection of corrected data 368 refers to selecting data stored in an internal storage to send to host 310. The uncorrected data path provides a low-latency path for read data to host 310, as there can be potentially multiple nanoseconds of latency associated with the operation of error correction 366.

FIG. 4 is an example of a table of error detection indicators. Table 400 represents a metadata encoding for error indication information, such as error indication 362 of system 300. In one example, there are two pins, SEV[0:1] to provide error indication information from the memory to the memory controller. In one example, a single pin could be used. SEV can refer to a "severity" bit, or a bit to indicate a severity of errors detected in the read data from the array. It will be understood that the encoding illustrated is merely one example, and different encoding can be used.

The burst position can represent bit positions for a BL8 or burst length of eight with burst positions BP[0:7]. In one example, an indication of NE (no error) can have all zeros for BP[0:7] for SEV[0], as illustrated at row 412 of table 400. Row 414 illustrates all zeros for BP[0:7] for SEV[1] for the NE indication.

Row 422 illustrates zeros for BP[0:3] and ones for BP[4:7] for SEV[0] for an indication of correctable error single bit (CEs). Row 424 illustrates all zeros for BP[0:7] for SEV[1] for an indication of CEs.

Row 432 illustrates all zeros for BP[0:7] for SEV[0] for an indication of correctable error multibit (CEm), for a system in which a multibit error can be corrected with internal ECC. Row 434 illustrates zeros for BP[0:3] and ones for BP[4:7] for SEV[1] for an indication of CEm.

Row 442 illustrates zeros for BP[0:3] and ones for BP[4:7] for SEV[0] for an indication of uncorrectable error (UE). Row 444 illustrates zeros for BP[0:3] and ones for BP[4:7] for SEV[1] for an indication of UE.

Row 452 illustrates ones for BP[0:3] and zeros for BP[4:7] for SEV[0] for an indication of correctable error, not corrected (CENC). Row 454 illustrates ones for BP[0:3] and zeros for BP[4:7] for SEV[1] for an indication of CENC. The host can take additional actions based on an indication of CENC, in accordance with what is described above.

While shown as a single encoding, in one example, the CENC indication can be split into different CENC commands for SBE CE and MBE CE. Thus, there can be different encoding patterns (not shown) for different types of uncorrected errors.

Figure 5:
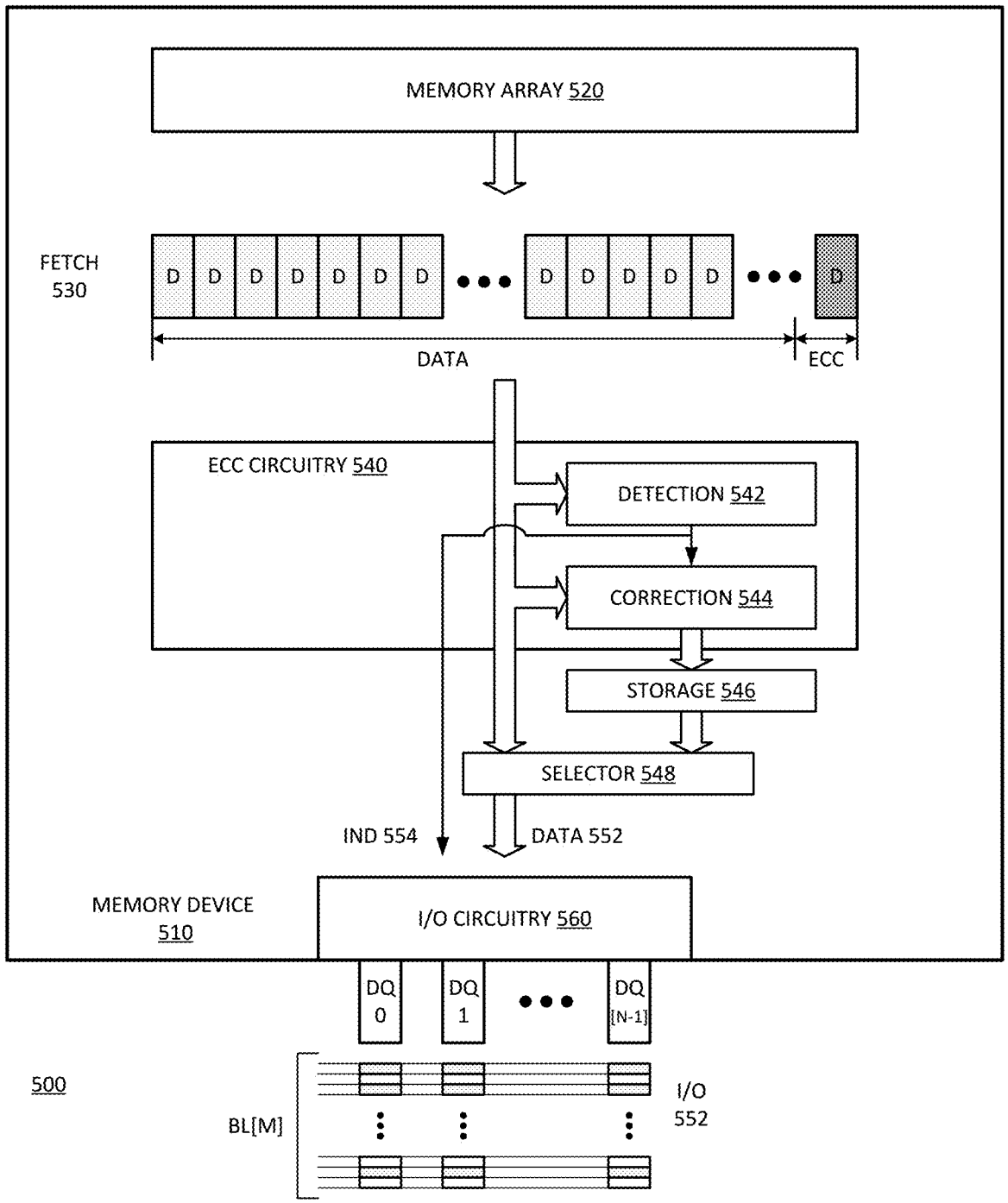
FIG. 5 is a block diagram of an example of a data architecture for a memory architecture that allows for selective sending of corrected data from on-die ECC.

FIG. 5 is a block diagram of an example of a data architecture for a memory architecture that allows for selective sending of corrected data from on-die ECC. System 500 represents elements that can be incorporated in a system such as system 100 or system 200 or system 300. System 500 represents a core memory architecture. As illustrated, the memory core performs a fetch of data (which in one example is a prefetch and data selection), and includes ECC bits for internal ECC. System 500 illustrates a xN architecture, which refers to memory device 510 having N DQ signal interfaces to a data bus.

In one example, memory device 510 uses all data accessed from memory array 520 to respond to the read request. In such an example, fetch 530 provides all data accessed from memory array 520 to ECC circuitry 540 for ECC operations. In one example, memory device uses less than all the data access from memory array 520 to response to the read request. In such an example, fetch 530 can all data from memory array 520 and select a portion of the data to provide to ECC circuitry 540 for ECC operations.

ECC circuitry 540 represents on-device or internal ECC logic for memory device 510. In one example, ECC circuitry 540 can be thought of or referred to as an ECC engine. In one example, ECC circuitry 540 includes error detection 542 to detect errors in the read data and generate indication (IND) 554 to provide to the host. I/O circuitry 560 illustrates interfaces to DQ[0:(N–1)], and does not illustrate metadata signal lines. In one example, I/O circuitry 560 includes interfaces to one or more metadata signal lines to provide indication 554 to the host.

In one example, ECC circuitry 540 includes correction 544, which represents error correction logic within memory device 510, and which is bypassed for a first read to an address. Thus, in response to a first read request to an address, memory device 510 can provide indication 554 and data 552 as the uncorrected read data accessed by fetch 530 from memory array 520. In such a case, data 552 is the uncorrected data.

In one example, correction 544 generates corrected data to store in storage 546. Selector 548 can select between the uncorrected data from memory array 520 and the corrected data from storage 546 based on whether the read request is the first read request for the address or a subsequent read request. Alternatively, corrected data can be stored in, and read by the host from, a specific storage location as discussed above. In the case where the corrected data is selected, data 552 to send to the host is the corrected data from storage 546.

System 500 illustrates how the data (and error indication) can be sent from memory device 510 to the host as I/O 560, sent from the interface pins over a burst length of M. In one example, the burst length of the error indication is the same as the burst length of the data transmission. In one example, the error indication has a different burst length than the data transmission burst length.

Figure 6:
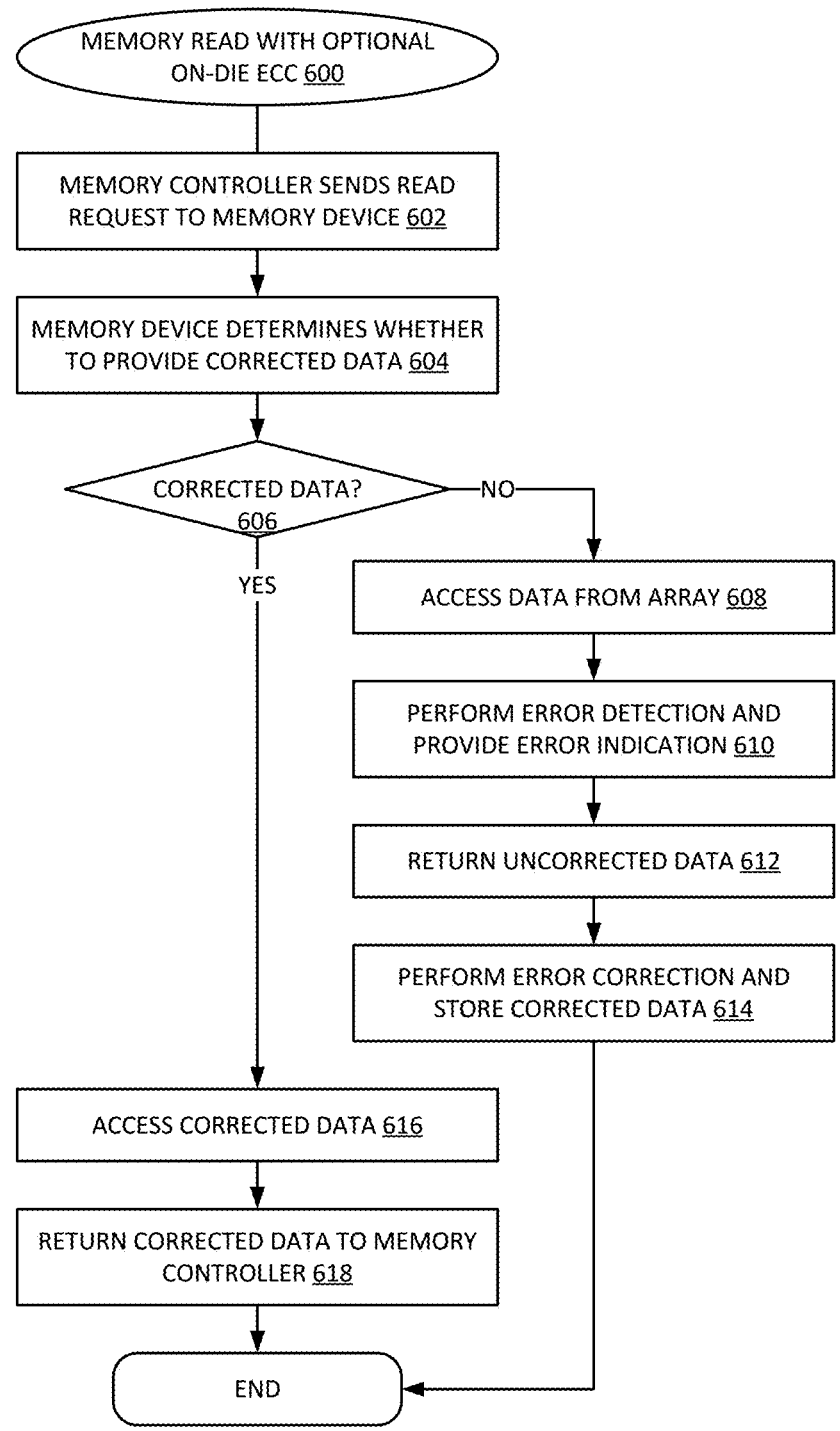
FIG. 6 is a flow diagram of an example of a process for selectively sending corrected data from on-die ECC.

FIG. 6 is a flow diagram of an example of a process for selectively sending corrected data from on-die ECC. Process 600 represents a process for a memory read with optional on-die error correction. Such a process can be performed by ECC circuitry in accordance with system 100, system 200, system 300, or system 500.

The memory controller generates and sends a read request to a memory device, at 602. In one example, the memory device determines if it should provide corrected data or uncorrected data in response to the read request, at 604. If the read request is an initial read request for the data, the memory device can return uncorrected data. If the read request is a subsequent read request, the memory device can return corrected data.

If the memory device should not return corrected data, at 606 NO branch, in one example, the memory device accesses the data from the memory array, at 608. ECC circuitry or logic on the memory device can perform error detection and provide an error indication in response to the read request, at 610. In addition to the error indication, the memory device can return uncorrected data, at 612. In one example, the ECC circuitry performs error correction on the data and stores the corrected data result in a storage of the memory device, at 614. In one example, the memory device only performs error correction when the error indication is a correctable error. In one example, the memory device performs error correction and only stores the corrected data when the error indication is a correctable error.

After storing the corrected data, the read operation can end. In one example, in response to the error indication, the memory controller will generate a subsequent read request for the corrected data. Thus, the memory device should provide corrected data in response to such a read request.

If the memory device is to provide corrected data, at 606 YES branch, in one example, the memory device accesses the data from the internal storage location (e.g., a buffer, a register, a dedicated address of the array), at 616. The memory device can then return the corrected data to the memory controller, at 618. In one example, access to the corrected data will not involve error detection or correction, which were performed in response to the original request. In one example, where corrected data is scrubbed and written back to the array, access to the corrected data can refer to a subsequent access to the same address of the array, and error detection can be performed again.

Figure 7:
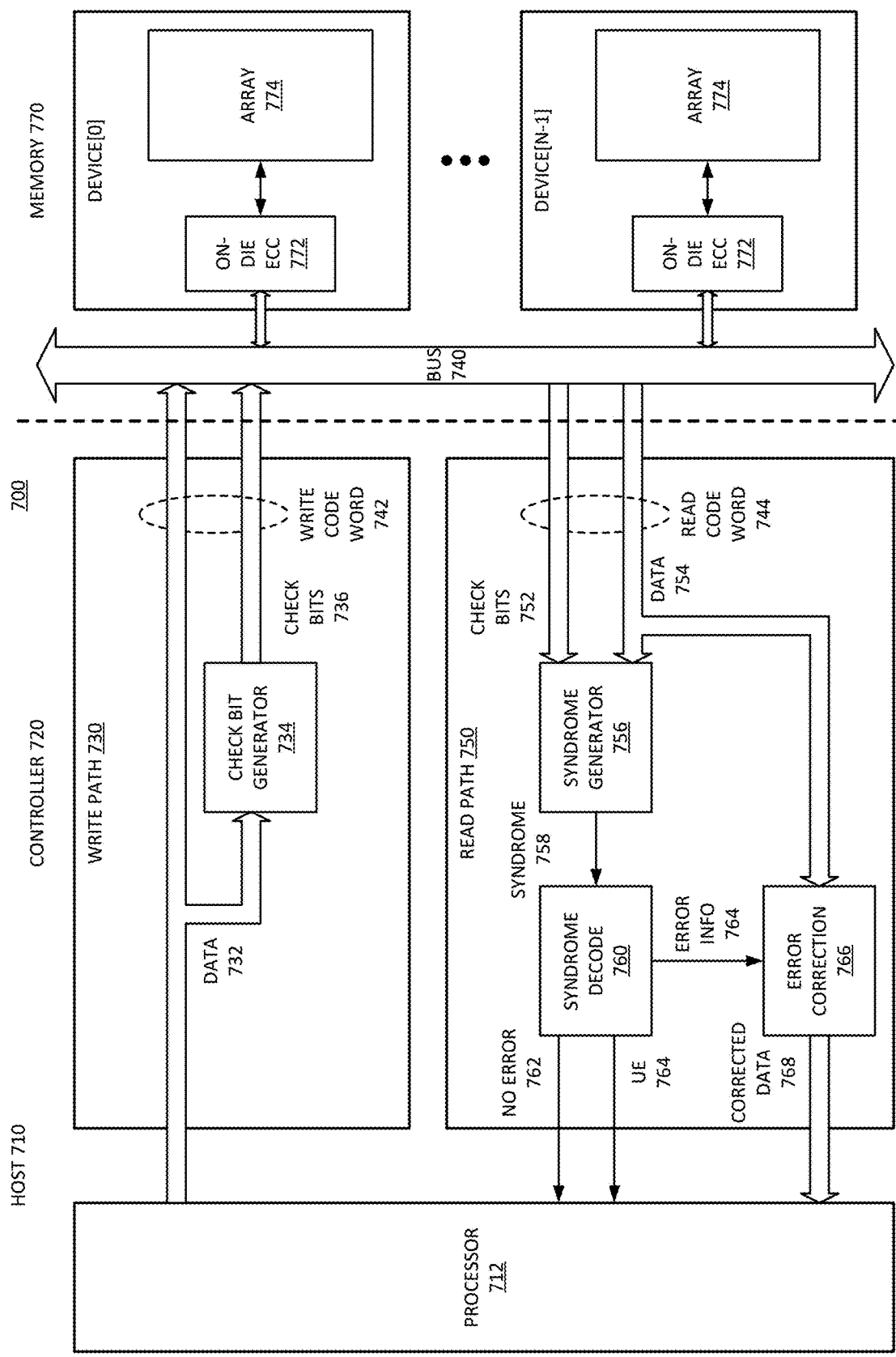
FIG. 7 is a block diagram of an example of system level error checking and correction.

FIG. 7 is a block diagram of an example of system level error checking and correction. System 700 provides an example of system level ECC circuitry for a system in accordance with any example of host side or memory controller ECC herein. Host 710 includes controller 720 or equivalent or alternative logic or circuit or component that manages access to memory 770. Controller 720 performs external ECC on data read from memory 770. In one example, memory 770 implements on-die ECC 772 to check and correct data from array 774 prior to sending the data over bus 740 to host 710. The performance of on-die ECC 772 can be in accordance with any example provided herein.

Host 710 includes processor 712 to execute operations that will generate requests for data stored in array 774 of memory 770. In response to a request to write data, controller 720 can generate a write command through write path 730. For a read request, controller 720 receives read data through read path 750.

Write path 730 represents a path for data written from processor 712 to memory 770. Processor 712 provides data 732 for writing to memory 770. In one example, controller 720 generates check bits 736 with check bit generator 734 to store with the data 732 in memory. Check bits 736 can be referred to as ECC bits, and enable error correction for an error that might occur in the writing to and reading from the memory array(s) 774. Data 732 and check bits 736 can be included as write codeword 742, which is written to memory 770, over data bus 740 into array 774.

Read path 750 represents a path for data read from memory 770 to host 710. In one example, at least certain hardware components of write path 730 and read path 750 are the same hardware. In one example, memory 770 fetches the data in response to a Read command from host 710. Read code word 744 represents the data and check bits that were stored in array 774. Data 754 and check bits 752 represent the data and check bits of read codeword 744. Read code word 744 represents a codeword made up of data from Device [0:(N−1)]. In one example, these correspond, respectively, to data 732 and check bits 736 written in write path 730 to the same address of the read command.

Read path 750 includes syndrome generator 756 to apply H matrix computations on data 754 and check bits 752 to detect errors in the read data. Syndrome generator 756 can generate syndrome 758 for use in generating appropriate error information for the read data. Data 754 can also be forwarded to error correction 766 for correction of a detected error.

In one example, syndrome generator 756 passes syndrome 758 to syndrome decode 760 to generate an error vector. In one example, check bit generator 734 and syndrome generator 756 are fully specified by a corresponding H matrix. In one example, if there are no errors in the read data (e.g., zero syndrome 758), syndrome generator 756 generates a no error signal 762. In one example, if there are multiple errors in the read data (e.g., non-zero syndrome 758 that does not match any of the columns in a corresponding H matrix), syndrome decode 760 generates an UE (uncorrectable error) signal 764. UE signal 764 can indicate a multibit error that was not able to be corrected by the application of ECC.

In one example, if there is a single bit error (e.g., non-zero syndrome 758 that matches one of the columns of a corresponding H matrix), syndrome decode 760 can generate error information to provide to error correction logic 766. Error correction 766 can apply the correctable error to the specified location in data 754 to generate corrected data 768 for output to provide to processor 712.

In one example, memory 770 includes on-die ECC 772 to perform selective application of error correction to data read from array 774. The selective application of error correction can be in accordance with any example herein. With the selective application of error correction enables memory devices[0:N−1] to provide uncorrected data by default to a read command. Memory 770 can provide corrected data to host 710 in response to a subsequent command. In one example, controller 720 provides error correction for uncorrected data with correctable errors to avoid the need for a subsequent read command to access the corrected data.

Figure 8:
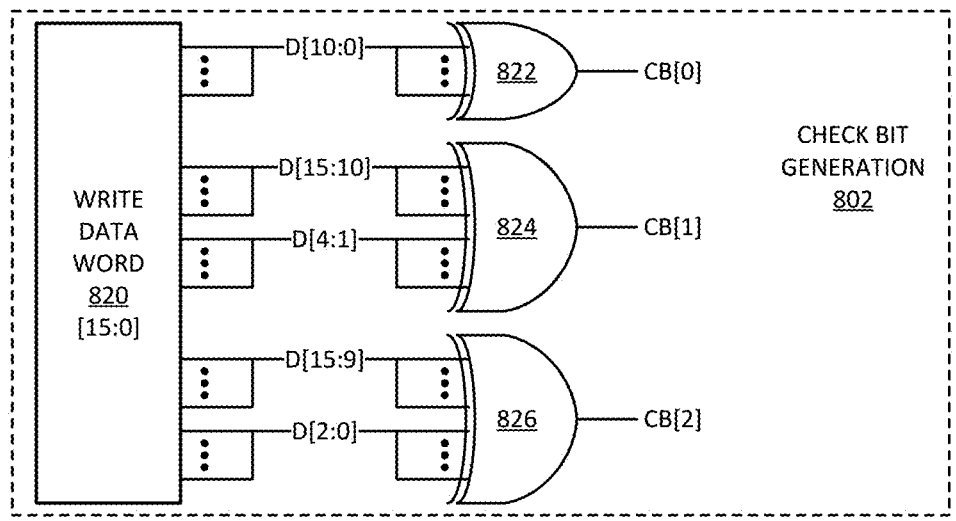
FIG. 8 is a block diagram of an example of check bit generation logic and syndrome bit generation logic to apply a matrix for ECC.
Figure 8:
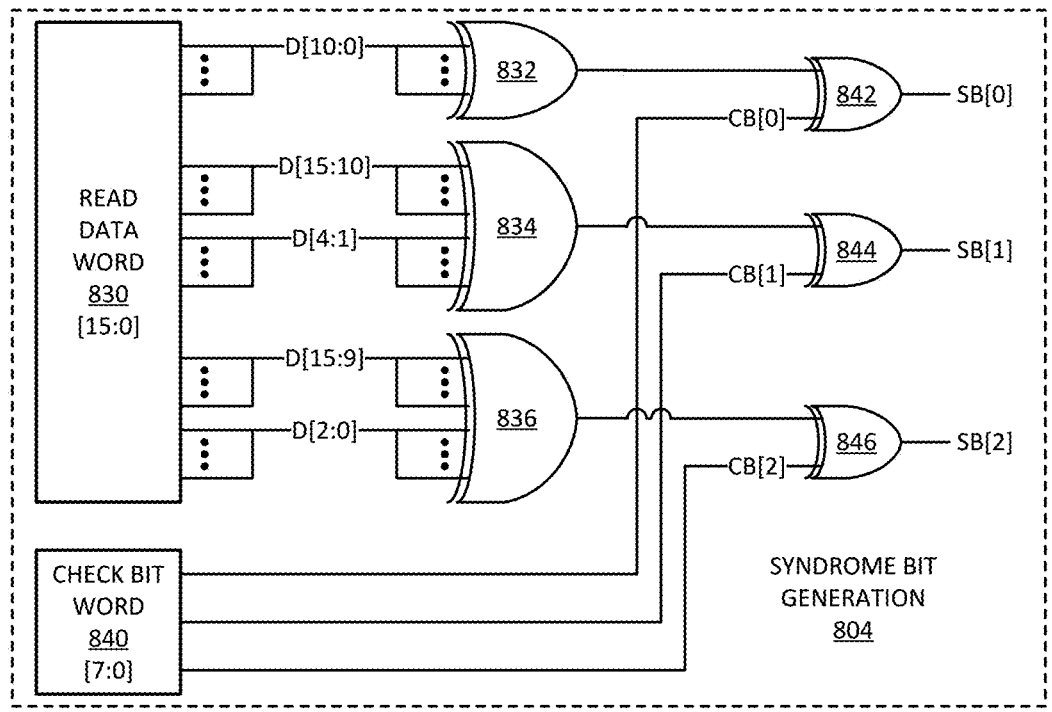

FIG. 8 is a block diagram of an example of check bit generation logic and syndrome bit generation logic to apply a matrix for ECC. H-matrix 810 represents a simplified example of the application of ECC by a memory device for on-die ECC in accordance with system 300 or by a memory controller for system ECC in accordance with an example of system 700. H-matrix 810 provides a simplified example of how detection and correction of correctable errors can occur.

H matrix 810 represents an example of 16 bits of a code matrix for use with on-device ECC. It will be understood that a typical operational code word in modern computing systems includes more than 16 bits. However, the 16-bit H-matrix illustrates principles of ECC operation for either on-die ECC to be used in on-memory error checking and correction in accordance with any example herein or for system level ECC by the memory controller or error control in accordance with any example herein.

Matrix 810 can be part of an SEC (single bit error correcting) Hamming code, such as a hamming code for a 128-bit code word. Matrix 810 illustrates only 16 codes, one code bit for each data bit [15:0]. In one example, every code of matrix 810 corresponds to one data bit. In the example illustrated, each code includes 8 check bits CB[0:7]. When a syndrome is computed from the data word and check bits stored in the memory, the ECC engine can determine if the syndrome corresponds to one of the codes in matrix 810. If the ECC engine determines a syndrome matches with one of the codes, the ECC engine toggles the corresponding data bit to correct an error. Examples of check bit generation and syndrome bit generation are illustrated.

Check bit generation logic 802 represents logic to perform ECC operations to generate check bits. Syndrome bit generation logic 804 represents logic to perform ECC operations to generate syndrome bits to compare against the check bit. For purposes of illustration in the drawing, only logic related to check bits CB[0:2] are illustrated, and correspondingly, only syndrome bits SB[0:2] are illustrated.

As illustrated, the syndrome can be completely encoded in the ECC logic for the check bit generation and syndrome bit generation. In one example, check bit generation 802 includes XOR gates to receive write data word 820 and perform XOR operations for the one-bits of the code. For example, generation of CB[0] with respect to the 16 code word bits illustrated, bits D[10:0] are all ones, whereas bits D[15:11] are zeros. Thus, in one example, computation of CB[0] includes the XOR operation with XOR 822 of bits D[10:0] of the code word. Similarly, generation of the syndrome bit SB[0] includes logic to receive read data word 830 and perform XOR operation with XOR 832 of bits D[10:0] of the read data code word. The output of XOR 832 is then XORed with XOR 842 with CB[0] to generate SB[0].

It will be understood that as a technical matter, a true XOR operation can only exist for two inputs, where an output is one if and only if only one of the inputs is one. However, it is common convention to represent a cascade of XOR operations as a multi-input XOR (meaning a number of inputs greater than 2), such as XOR 822 for CB[0] and XOR 832 for SB[0]. The XOR operation has a commutative property, and the XORing of multiple pairs of inputs, and then the series XORing of the outputs of those operations can be interchanged in any order with the same result. Thus, the XOR operations have the practical effect of modulo 2 addition, which is also equivalent to odd parity detection. Odd parity detection provides a '1' as the output when there is an odd number of ones among the inputs, and an output zero when there is an even number of ones among the inputs.

In another example, generation of CB[1] with respect to the 16 code word bits illustrated, bits D[15:10] and D[4:1] are ones, and bits D[9:5] and D[0] are zeros. XOR 824 computes CB[1] from the one bits. Similarly, for the generation of CB[2], bits D[15:9] and D[2:0] are ones, and bits D[8:3] are zeros. XOR 826 computes CB[2] from the one bits.

Syndrome bit generation 804 represents logic to receive read data word 830 and check bit word 840, and generate the syndrome bits by comparison of the CB computation with the stored check bits. Similarly, syndrome bit generation of SB[1] with respect to the 16 code word bits illustrated, XOR 834 computes an XOR of D[15:10] and D[4:1], and then XOR 844 computes SB[1] by XOR of CB[1] with the output of XOR 834. Similarly, syndrome bit generation of SB[2] with respect to the 16 code word bits illustrated, XOR 836 computes an XOR of D[15:9] and D[2:0], and then XOR 846 computes SB[2] by XOR of CB[2] with the output of XOR 836.

Based on the determination of the check bits and syndrome bits, the system can identify errors and potentially flip bits, e.g., for a bit or column of CB[7:0] found to match with the syndrome bits. An ECS system can apply such techniques to perform scrubbing on memory addresses. In one example, a system performs error correction in parallel with sending error detection and reporting to the host, in accordance with any example herein.

Figure 9:
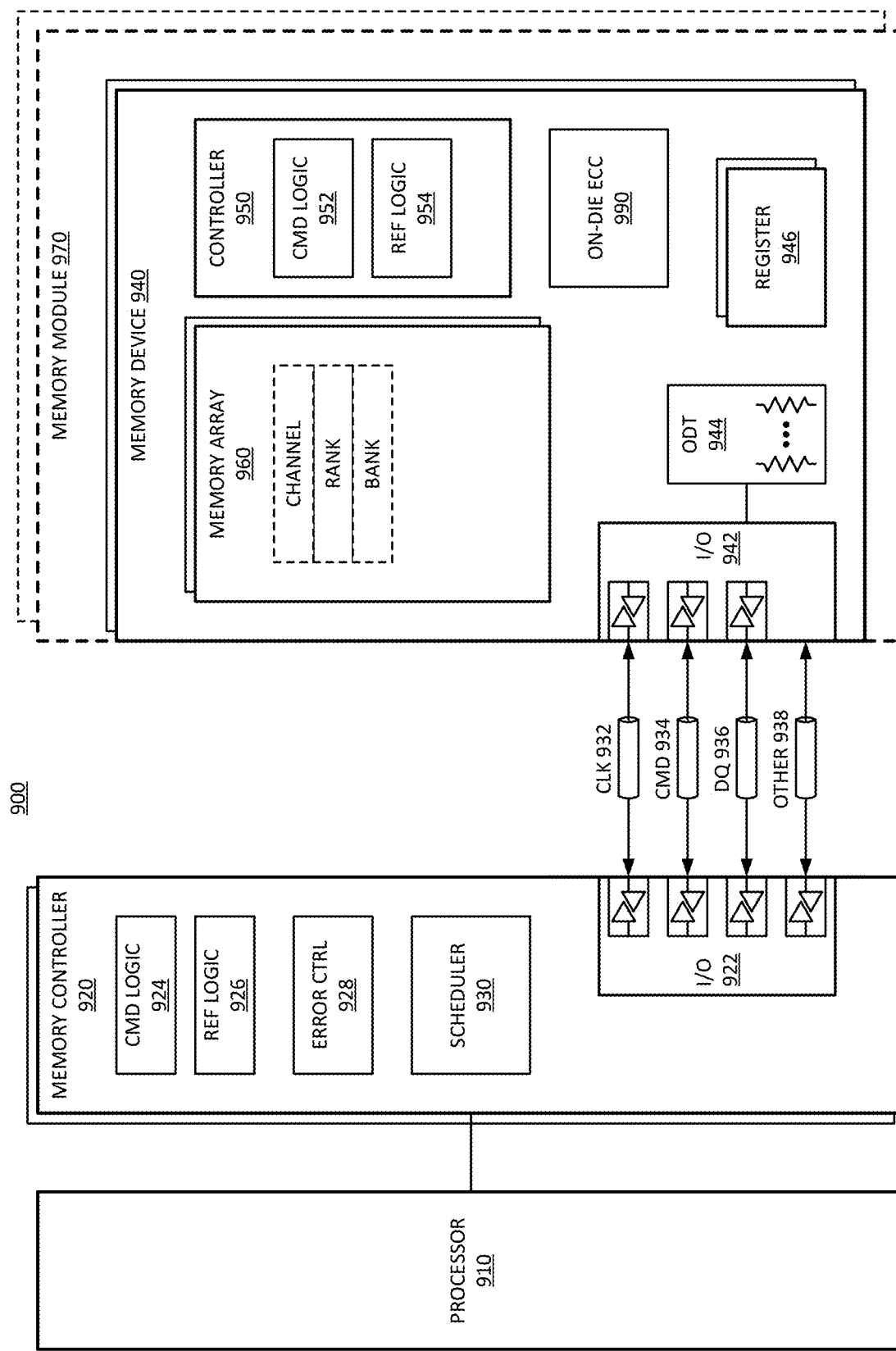
FIG. 9 is a block diagram of an example of a memory subsystem in which selective sending of corrected data from on-memory ECC can be implemented.

FIG. 9 is a block diagram of an example of a memory subsystem in which selective sending of corrected data from on-memory ECC can be implemented. System 900 includes a processor and elements of a memory subsystem in a computing device. System 900 is an example of a system in accordance with an example of system 100 or system 200.

In one example, memory device 940 includes on-die ECC 990. ECC 990 represents on-die ECC for memory device 940, to enable error checking and the selective providing of corrected data to memory controller 920, in accordance with any example herein. In one example, memory controller 920 includes error control 928 to represent logic within memory controller 920 to enable determination about whether to issue a subsequent read command to access corrected data. In one example, typically, memory device 940 provides uncorrected data to memory controller 920 in response to a read command, performs error correction in parallel to providing the uncorrected data, and can provide the corrected data in response to a subsequent request by memory controller 920.

Processor 910 represents a processing unit of a computing platform that may execute an operating system (OS) and applications, which can collectively be referred to as the host or the user of the memory. The OS and applications execute operations that result in memory accesses. Processor 910 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 900 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, originally published by JEDEC in July 2020), LPDDR5 (LPDDR version 5, JESD209-5, originally published by JEDEC in February 2019), HBM2 (HBM version 2, JESD235C, originally published by JEDEC in January 2020), HBM3 (HBM version 3 currently in discussion by JEDEC), or others or combinations of memory technologies, and technologies based on derivatives or extensions of such specifications.

In addition to, or alternatively to, volatile memory, in one example, the memory module can be a persistent memory DIMM or nonvolatile system memory, referring to nonvolatile memory connected to the system memory bus. Such a memory device can include a three dimensional crosspoint (3DXP) memory device. 3DXP can operate as a byte addressable nonvolatile memory device or as a block addressable nonvolatile memory device. A memory device can include a nonvolatile, byte addressable media or block addressable media that stores data based on a resistive state of the memory cell, or a phase of the memory cell. In one example, the memory device can use chalcogenide phase change material (e.g., chalcogenide glass). In one example, the system memory device can be or include 3DXP, single or multi-level phase change memory (PCM) or phase change memory with a switch (PCMS), a resistive memory, nanowire memory, ferroelectric transistor random-access memory (FeTRAM), magnetoresistive random-access memory (MRAM) memory that incorporates memristor technology, or spin transfer torque (STT)-MRAM, or a combination of any of the above, or other memory.

Memory controller 920 represents one or more memory controller circuits or devices for system 900. Memory controller 920 represents control logic that generates memory access commands in response to the execution of operations by processor 910. Memory controller 920 accesses one or more memory devices 940. Memory devices 940 can be DRAM devices in accordance with any referred to above. In one example, memory devices 940 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 920 manages a separate memory channel, although system 900 can be configured to have multiple channels managed by a single controller, or to have multiple controllers on a single channel. In one example, memory controller 920 is part of host processor 910, such as logic implemented on the same die or implemented in the same package space as the processor.

Memory controller 920 includes I/O interface logic 922 to couple to a memory bus, such as a memory channel as referred to above. I/O interface logic 922 (as well as I/O interface logic 942 of memory device 940) can include pins, pads, connectors, signal lines, traces, or wires, or other hardware to connect the devices, or a combination of these. I/O interface logic 922 can include a hardware interface. As illustrated, I/O interface logic 922 includes at least drivers/transceivers for signal lines. Commonly, wires within an integrated circuit interface couple with a pad, pin, or connector to interface signal lines or traces or other wires between devices. I/O interface logic 922 can include drivers, receivers, transceivers, or termination, or other circuitry or combinations of circuitry to exchange signals on the signal lines between the devices. The exchange of signals includes at least one of transmit or receive. While shown as coupling I/O 922 from memory controller 920 to I/O 942 of memory device 940, it will be understood that in an implementation of system 900 where groups of memory devices 940 are accessed in parallel, multiple memory devices can include I/O interfaces to the same interface of memory controller 920. In an implementation of system 900 including one or more memory modules 970, I/O 942 can include interface hardware of the memory module in addition to interface hardware on the memory device itself. Other memory controllers 920 will include separate interfaces to other memory devices 940.

The bus between memory controller 920 and memory devices 940 can be implemented as multiple signal lines coupling memory controller 920 to memory devices 940. The bus may typically include at least clock (CLK) 932, command/address (CMD) 934, and write data (DQ) and read data (DQ) 936, and zero or more other signal lines 938. In one example, a bus or connection between memory controller 920 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 900 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 920 and memory devices 940. An example of a serial bus technology is 9B10B encoding and transmission of high-speed data with embedded clock over a single differential pair of signals in each direction. In one example, CMD 934 represents signal lines shared in parallel with multiple memory devices. In one example, multiple memory devices share encoding command signal lines of CMD 934, and each has a separate chip select (CS_n) signal line to select individual memory devices.

It will be understood that in the example of system 900, the bus between memory controller 920 and memory devices 940 includes a subsidiary command bus CMD 934 and a subsidiary bus to carry the write and read data, DQ 936. In one example, the data bus can include bidirectional lines for read data and for write/command data. In another example, the subsidiary bus DQ 936 can include unidirectional write signal lines for write and data from the host to memory, and can include unidirectional lines for read data from the memory to the host. In accordance with the chosen memory technology and system design, other signals 938 may accompany a bus or sub bus, such as strobe lines DQS. Based on design of system 900, or implementation if a design supports multiple implementations, the data bus can have more or less bandwidth per memory device 940. For example, the data bus can support memory devices that have either a ×4 interface, a ×8 interface, a ×16 interface, or other interface. The convention "xW," where W is an integer that refers to an interface size or width of the interface of memory device 940, which represents a number of signal lines to exchange data with memory controller 920. The interface size of the memory devices is a controlling factor on how many memory devices can be used concurrently per channel in system 900 or coupled in parallel to the same signal lines. In one example, high bandwidth memory devices, wide interface devices, or stacked memory configurations, or combinations, can enable wider interfaces, such as a ×128 interface, a ×256 interface, a ×512 interface, a ×1024 interface, or other data bus interface width.

In one example, memory devices 940 and memory controller 920 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 940 can transfer data on each UI. Thus, a ×8 memory device operating on BL8 can transfer 64 bits of data (8 data signal lines times 8 data bits transferred per line over the burst). It will be understood that this simple example is merely an illustration and is not limiting.

Memory devices 940 represent memory resources for system 900. In one example, each memory device 940 is a separate memory die. In one example, each memory device 940 can interface with multiple (e.g., 2) channels per device or die. Each memory device 940 includes I/O interface logic 942, which has a bandwidth determined by the implementation of the device (e.g., ×16 or ×8 or some other interface bandwidth). I/O interface logic 942 enables the memory devices to interface with memory controller 920. I/O interface logic 942 can include a hardware interface, and can be in accordance with I/O 922 of memory controller, but at the memory device end. In one example, multiple memory devices 940 are connected in parallel to the same command and data buses. In another example, multiple memory devices 940 are connected in parallel to the same command bus, and are connected to different data buses. For example, system 900 can be configured with multiple memory devices 940 coupled in parallel, with each memory device responding to a command, and accessing memory resources 960 internal to each. For a Write operation, an individual memory device 940 can write a portion of the overall data word, and for a Read operation, an individual memory device 940 can fetch a portion of the overall data word. The remaining bits of the word will be provided or received by other memory devices in parallel.

In one example, memory devices 940 are disposed directly on a motherboard or host system platform (e.g., a PCB (printed circuit board) on which processor 910 is disposed) of a computing device. In one example, memory devices 940 can be organized into memory modules 970. In one example, memory modules 970 represent dual inline memory modules (DIMMs). In one example, memory modules 970 represent other organization of multiple memory devices to share at least a portion of access or control circuitry, which can be a separate circuit, a separate device, or a separate board from the host system platform. Memory modules 970 can include multiple memory devices 940, and the memory modules can include support for multiple separate channels to the included memory devices disposed on them. In another example, memory devices 940 may be incorporated into the same package as memory controller 920, such as by techniques such as multi-chip-module (MCM), package-on-package, through-silicon via (TSV), or other techniques or combinations. Similarly, in one example, multiple memory devices 940 may be incorporated into memory modules 970, which themselves may be incorporated into the same package as memory controller 920. It will be appreciated that for these and other implementations, memory controller 920 may be part of host processor 910.

Memory devices 940 each include one or more memory arrays 960. Memory array 960 represents addressable memory locations or storage locations for data. Typically, memory array 960 is managed as rows of data, accessed via wordline (rows) and bitline (individual bits within a row) control. Memory array 960 can be organized as separate channels, ranks, and banks of memory. Channels may refer to independent control paths to storage locations within memory devices 940. Ranks may refer to common locations across multiple memory devices (e.g., same row addresses within different devices) in parallel. Banks may refer to sub-arrays of memory locations within a memory device 940. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 940 include one or more registers 944. Register 944 represents one or more storage devices or storage locations that provide configuration or settings for the operation of the memory device. In one example, register 944 can provide a storage location for memory device 940 to store data for access by memory controller 920 as part of a control or management operation. In one example, register 944 includes one or more Mode Registers. In one example, register 944 includes one or more multipurpose registers. The configuration of locations within register 944 can configure memory device 940 to operate in different "modes," where command information can trigger different operations within memory device 940 based on the mode. Additionally or in the alternative, different modes can also trigger different operation from address information or other signal lines depending on the mode. Settings of register 944 can indicate configuration for I/O settings (e.g., timing, termination or ODT (on-die termination) 946, driver configuration, or other I/O settings).

In one example, memory device 940 includes ODT 946 as part of the interface hardware associated with I/O 942. ODT 946 can be configured as mentioned above, and provide settings for impedance to be applied to the interface to specified signal lines. In one example, ODT 946 is applied to DQ signal lines. In one example, ODT 946 is applied to command signal lines. In one example, ODT 946 is applied to address signal lines. In one example, ODT 946 can be applied to any combination of the preceding. The ODT settings can be changed based on whether a memory device is a selected target of an access operation or a non-target device. ODT 946 settings can affect the timing and reflections of signaling on the terminated lines. Careful control over ODT 946 can enable higher-speed operation with improved matching of applied impedance and loading. ODT 946 can be applied to specific signal lines of I/O interface 942, 922 (for example, ODT for DQ lines or ODT for CA lines), and is not necessarily applied to all signal lines.

Memory device 940 includes controller 950, which represents control logic within the memory device to control internal operations within the memory device. For example, controller 950 decodes commands sent by memory controller 920 and generates internal operations to execute or satisfy the commands. Controller 950 can be referred to as an internal controller, and is separate from memory controller 920 of the host. Controller 950 can determine what mode is selected based on register 944, and configure the internal execution of operations for access to memory resources 960 or other operations based on the selected mode. Controller 950 generates control signals to control the routing of bits within memory device 940 to provide a proper interface for the selected mode and direct a command to the proper memory locations or addresses. Controller 950 includes command logic 952, which can decode command encoding received on command and address signal lines. Thus, command logic 952 can be or include a command decoder. With command logic 952, memory device can identify commands and generate internal operations to execute requested commands.

Referring again to memory controller 920, memory controller 920 includes command (CMD) logic 924, which represents logic or circuitry to generate commands to send to memory devices 940. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 940, memory controller 920 can issue commands via I/O 922 to cause memory device 940 to execute the commands. In one example, controller 950 of memory device 940 receives and decodes command and address information received via I/O 942 from memory controller 920. Based on the received command and address information, controller 950 can control the timing of operations of the logic and circuitry within memory device 940 to execute the commands. Controller 950 is responsible for compliance with standards or specifications within memory device 940, such as timing and signaling requirements. Memory controller 920 can implement compliance with standards or specifications by access scheduling and control.

Memory controller 920 includes scheduler 930, which represents logic or circuitry to generate and order transactions to send to memory device 940. From one perspective, the primary function of memory controller 920 could be said to schedule memory access and other transactions to memory device 940. Such scheduling can include generating the transactions themselves to implement the requests for data by processor 910 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 920 typically includes logic such as scheduler 930 to allow selection and ordering of transactions to improve performance of system 900. Thus, memory controller 920 can select which of the outstanding transactions should be sent to memory device 940 in which order, which is typically achieved with logic much more complex that a simple first-in first-out algorithm. Memory controller 920 manages the transmission of the transactions to memory device 940, and manages the timing associated with the transaction. In one example, transactions have deterministic timing, which can be managed by memory controller 920 and used in determining how to schedule the transactions with scheduler 930.

In one example, memory controller 920 includes refresh (REF) logic 926. Refresh logic 926 can be used for memory resources that are volatile and need to be refreshed to retain a deterministic state. In one example, refresh logic 926 indicates a location for refresh, and a type of refresh to perform. Refresh logic 926 can trigger self-refresh within memory device 940, or execute external refreshes which can be referred to as auto refresh commands) by sending refresh commands, or a combination. In one example, controller 950 within memory device 940 includes refresh logic 954 to apply refresh within memory device 940. In one example, refresh logic 954 generates internal operations to perform refresh in accordance with an external refresh received from memory controller 920. Refresh logic 954 can determine if a refresh is directed to memory device 940, and what memory resources 960 to refresh in response to the command.

Figure 10:
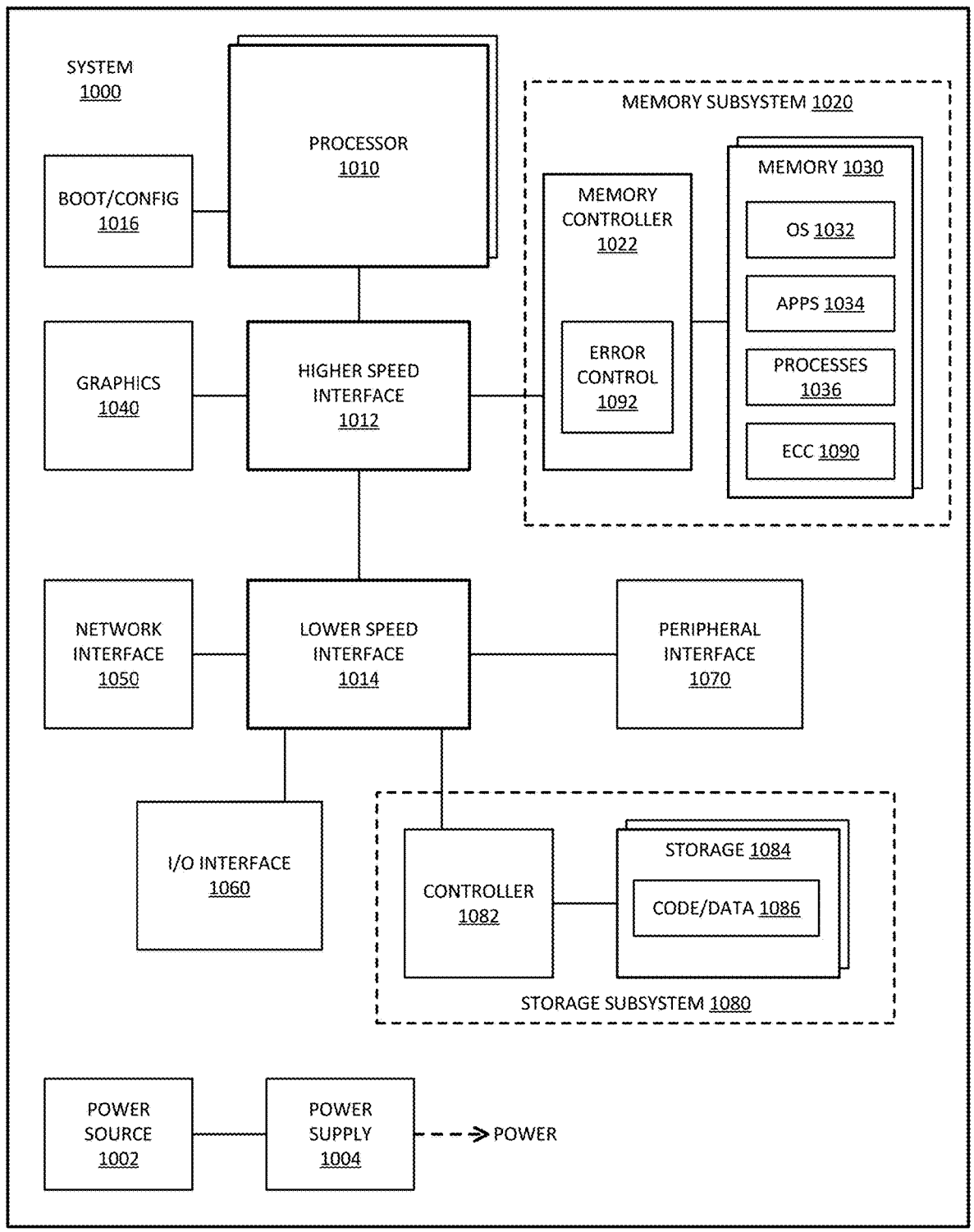
FIG. 10 is a block diagram of an example of a computing system in which selective sending of corrected data from on-memory ECC can be implemented.

FIG. 10 is a block diagram of an example of a computing system in which selective sending of corrected data from on-memory ECC can be implemented. System 1000 represents a computing device in accordance with any example herein, and can be a laptop computer, a desktop computer, a tablet computer, a server, a gaming or entertainment control system, embedded computing device, or other electronic device. System 1000 represents a system in accordance with an example of system 100 or system 200.

In one example, memory 1030 includes on-die ECC 1090. ECC 1090 represents on-die ECC for memory 1030, to enable error checking and the selective providing of corrected data to memory controller 1022, in accordance with any example herein. In one example, memory controller 1022 includes error control 1092 to represent logic within memory controller 1022 to enable determination about whether to issue a subsequent read command to access corrected data. In one example, typically, memory 1030 provides uncorrected data to memory controller 1022 in response to a read command, performs error correction in parallel to providing the uncorrected data, and can provide the corrected data in response to a subsequent request by memory controller 1022.

System 1000 includes processor 1010 can include any type of microprocessor, central processing unit (CPU), graphics processing unit (GPU), processing core, or other processing hardware, or a combination, to provide processing or execution of instructions for system 1000. Processor 1010 can be a host processor device. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or a combination of such devices.

System 1000 includes boot/config 1016, which represents storage to store boot code (e.g., basic input/output system (BIOS)), configuration settings, security hardware (e.g., trusted platform module (TPM)), or other system level hardware that operates outside of a host OS. Boot/config 1016 can include a nonvolatile storage device, such as read-only memory (ROM), flash memory, or other memory devices.

In one example, system 1000 includes interface 1012 coupled to processor 1010, which can represent a higher speed interface or a high throughput interface for system components that need higher bandwidth connections, such as memory subsystem 1020 or graphics interface components 1040. Interface 1012 represents an interface circuit, which can be a standalone component or integrated onto a processor die. Interface 1012 can be integrated as a circuit onto the processor die or integrated as a component on a system on a chip. Where present, graphics interface 1040 interfaces to graphics components for providing a visual display to a user of system 1000. Graphics interface 1040 can be a standalone component or integrated onto the processor die or system on a chip. In one example, graphics interface 1040 can drive a high definition (HD) display or ultra high definition (UHD) display that provides an output to a user. In one example, the display can include a touchscreen display. In one example, graphics interface 1040 generates a display based on data stored in memory 1030 or based on operations executed by processor 1010 or both.

Memory subsystem 1020 represents the main memory of system 1000, and provides storage for code to be executed by processor 1010, or data values to be used in executing a routine. Memory subsystem 1020 can include one or more varieties of random-access memory (RAM) such as DRAM, 3DXP (three-dimensional crosspoint), or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010, such as integrated onto the processor die or a system on a chip.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 1000 includes interface 1014, which can be coupled to interface 1012. Interface 1014 can be a lower speed interface than interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can exchange data with a remote device, which can include sending data stored in memory or receiving data to be stored in memory.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, NAND, 3DXP, or optical based disks, or a combination. Storage 1084 holds code or instructions and data 1086 in a persistent state (i.e., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (i.e., the value or state of the data is indeterminate if power is interrupted to system 1000). In one example, storage subsystem 1080 includes controller 1082 to interface with storage 1084. In one example controller 1082 is a physical part of interface 1014 or processor 1010, or can include circuits or logic in both processor 1010 and interface 1014.

Power source 1002 provides power to the components of system 1000. More specifically, power source 1002 typically interfaces to one or multiple power supplies 1004 in system 1000 to provide power to the components of system 1000. In one example, power supply 1004 includes an AC to DC (alternating current to direct current) adapter to plug into a wall outlet. Such AC power can be renewable energy (e.g., solar power) power source 1002. In one example, power source 1002 includes a DC power source, such as an external AC to DC converter. In one example, power source 1002 or power supply 1004 includes wireless charging hardware to charge via proximity to a charging field. In one example, power source 1002 can include an internal battery or fuel cell source.

Figure 11:
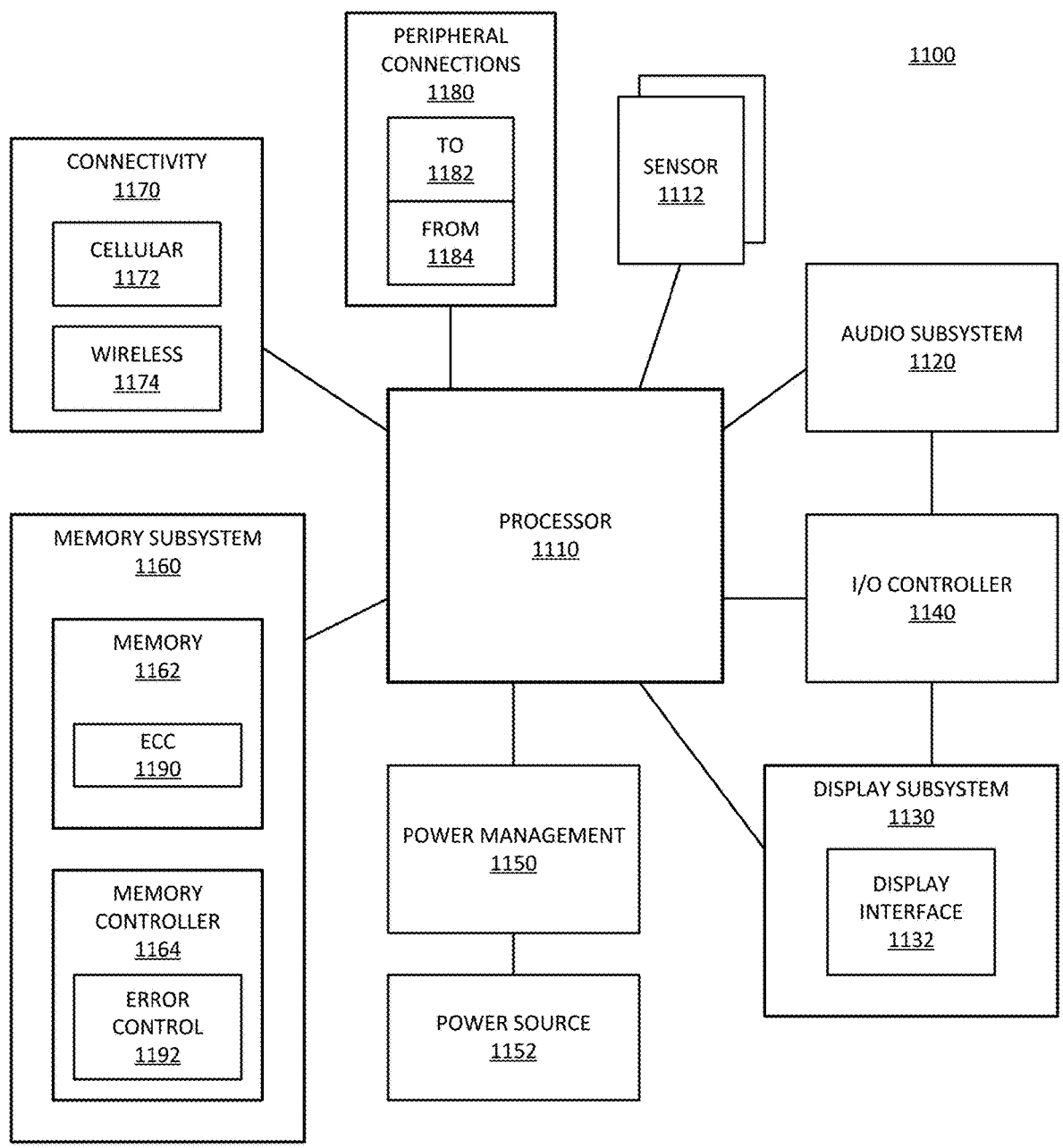
FIG. 11 is a block diagram of an example of a mobile device in which selective sending of corrected data from on-memory ECC can be implemented.

FIG. 11 is a block diagram of an example of a mobile device in which selective sending of corrected data from on-memory ECC can be implemented. System 1100 represents a mobile computing device, such as a computing tablet, a mobile phone or smartphone, wearable computing device, or other mobile device, or an embedded computing device. It will be understood that certain of the components are shown generally, and not all components of such a device are shown in system 1100. System 1100 represents a system in accordance with an example of system 100 or system 200.

In one example, memory 1162 includes on-die ECC 1190. ECC 1190 represents on-die ECC for memory 1162, to enable error checking and the selective providing of corrected data to memory controller 1164, in accordance with any example herein. In one example, memory controller 1164 includes error control 1192 to represent logic within memory controller 1164 to enable determination about whether to issue a subsequent read command to access corrected data. In one example, typically, memory 1162 provides uncorrected data to memory controller 1164 in response to a read command, performs error correction in parallel to providing the uncorrected data, and can provide the corrected data in response to a subsequent request by memory controller 1164.

System 1100 includes processor 1110, which performs the primary processing operations of system 1100. Processor 1110 can be a host processor device. Processor 1110 can include one or more physical devices, such as microprocessors, application processors, microcontrollers, programmable logic devices, or other processing means. The processing operations performed by processor 1110 include the execution of an operating platform or operating system on which applications and device functions are executed. The processing operations include operations related to I/O (input/output) with a human user or with other devices, operations related to power management, operations related to connecting system 1100 to another device, or a combination. The processing operations can also include operations related to audio I/O, display I/O, or other interfacing, or a combination. Processor 1110 can execute data stored in memory. Processor 1110 can write or edit data stored in memory.

In one example, system 1100 includes one or more sensors 1112. Sensors 1112 represent embedded sensors or interfaces to external sensors, or a combination. Sensors 1112 enable system 1100 to monitor or detect one or more conditions of an environment or a device in which system 1100 is implemented. Sensors 1112 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1112 can also include sensors for biometric systems such as fingerprint recognition systems, face detection or recognition systems, or other systems that detect or recognize user features. Sensors 1112 should be understood broadly, and not limiting on the many different types of sensors that could be implemented with system 1100. In one example, one or more sensors 1112 couples to processor 1110 via a frontend circuit integrated with processor 1110. In one example, one or more sensors 1112 couples to processor 1110 via another component of system 1100.

In one example, system 1100 includes audio subsystem 1120, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into system 1100, or connected to system 1100. In one example, a user interacts with system 1100 by providing audio commands that are received and processed by processor 1110.

Display subsystem 1130 represents hardware (e.g., display devices) and software components (e.g., drivers) that provide a visual display for presentation to a user. In one example, the display includes tactile components or touchscreen elements for a user to interact with the computing device. Display subsystem 1130 includes display interface 1132, which includes the particular screen or hardware device used to provide a display to a user. In one example, display interface 1132 includes logic separate from processor 1110 (such as a graphics processor) to perform at least some processing related to the display. In one example, display subsystem 1130 includes a touchscreen device that provides both output and input to a user. In one example, display subsystem 1130 includes a high definition (HD) or ultra-high definition (UHD) display that provides an output to a user. In one example, display subsystem includes or drives a touchscreen display. In one example, display subsystem 1130 generates display information based on data stored in memory or based on operations executed by processor 1110 or both.

I/O controller 1140 represents hardware devices and software components related to interaction with a user. I/O controller 1140 can operate to manage hardware that is part of audio subsystem 1120, or display subsystem 1130, or both. Additionally, I/O controller 1140 illustrates a connection point for additional devices that connect to system 1100 through which a user might interact with the system. For example, devices that can be attached to system 1100 might include microphone devices, speaker or stereo systems, video systems or other display device, keyboard or keypad devices, buttons/switches, or other I/O devices for use with specific applications such as card readers or other devices.

As mentioned above, I/O controller 1140 can interact with audio subsystem 1120 or display subsystem 1130 or both. For example, input through a microphone or other audio device can provide input or commands for one or more applications or functions of system 1100. Additionally, audio output can be provided instead of or in addition to display output. In another example, if display subsystem includes a touchscreen, the display device also acts as an input device, which can be at least partially managed by I/O controller 1140. There can also be additional buttons or switches on system 1100 to provide I/O functions managed by I/O controller 1140.

In one example, I/O controller 1140 manages devices such as accelerometers, cameras, light sensors or other environmental sensors, gyroscopes, global positioning system (GPS), or other hardware that can be included in system 1100, or sensors 1112. The input can be part of direct user interaction, as well as providing environmental input to the system to influence its operations (such as filtering for noise, adjusting displays for brightness detection, applying a flash for a camera, or other features).

In one example, system 1100 includes power management 1150 that manages battery power usage, charging of the battery, and features related to power saving operation. Power management 1150 manages power from power source 1152, which provides power to the components of system 1100. In one example, power source 1152 includes an AC to DC (alternating current to direct current) adapter to plug into a wall outlet. Such AC power can be renewable energy (e.g., solar power, motion based power). In one example, power source 1152 includes only DC power, which can be provided by a DC power source, such as an external AC to DC converter. In one example, power source 1152 includes wireless charging hardware to charge via proximity to a charging field. In one example, power source 1152 can include an internal battery or fuel cell source.

Memory subsystem 1160 includes memory device(s) 1162 for storing information in system 1100. Memory subsystem 1160 can include nonvolatile (state does not change if power to the memory device is interrupted) or volatile (state is indeterminate if power to the memory device is interrupted) memory devices, or a combination. Memory 1160 can store application data, user data, music, photos, documents, or other data, as well as system data (whether long-term or temporary) related to the execution of the applications and functions of system 1100. In one example, memory subsystem 1160 includes memory controller 1164 (which could also be considered part of the control of system 1100, and could potentially be considered part of processor 1110). Memory controller 1164 includes a scheduler to generate and issue commands to control access to memory device 1162.

Connectivity 1170 includes hardware devices (e.g., wireless or wired connectors and communication hardware, or a combination of wired and wireless hardware) and software components (e.g., drivers, protocol stacks) to enable system 1100 to communicate with external devices. The external device could be separate devices, such as other computing devices, wireless access points or base stations, as well as peripherals such as headsets, printers, or other devices. In one example, system 1100 exchanges data with an external device for storage in memory or for display on a display device. The exchanged data can include data to be stored in memory, or data already stored in memory, to read, write, or edit data.

Connectivity 1170 can include multiple different types of connectivity. To generalize, system 1100 is illustrated with cellular connectivity 1172 and wireless connectivity 1174. Cellular connectivity 1172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), 5G, or other cellular service standards. Wireless connectivity 1174 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1180 include hardware interfaces and connectors, as well as software components (e.g., drivers, protocol stacks) to make peripheral connections. It will be understood that system 1100 could both be a peripheral device ("to" 1182) to other computing devices, as well as have peripheral devices ("from" 1184) connected to it. System 1100 commonly has a "docking" connector to connect to other computing devices for purposes such as managing (e.g., downloading, uploading, changing, synchronizing) content on system 1100. Additionally, a docking connector can allow system 1100 to connect to certain peripherals that allow system 1100 to control content output, for example, to audiovisual or other systems.

In addition to a proprietary docking connector or other proprietary connection hardware, system 1100 can make peripheral connections 1180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

Figure 12:
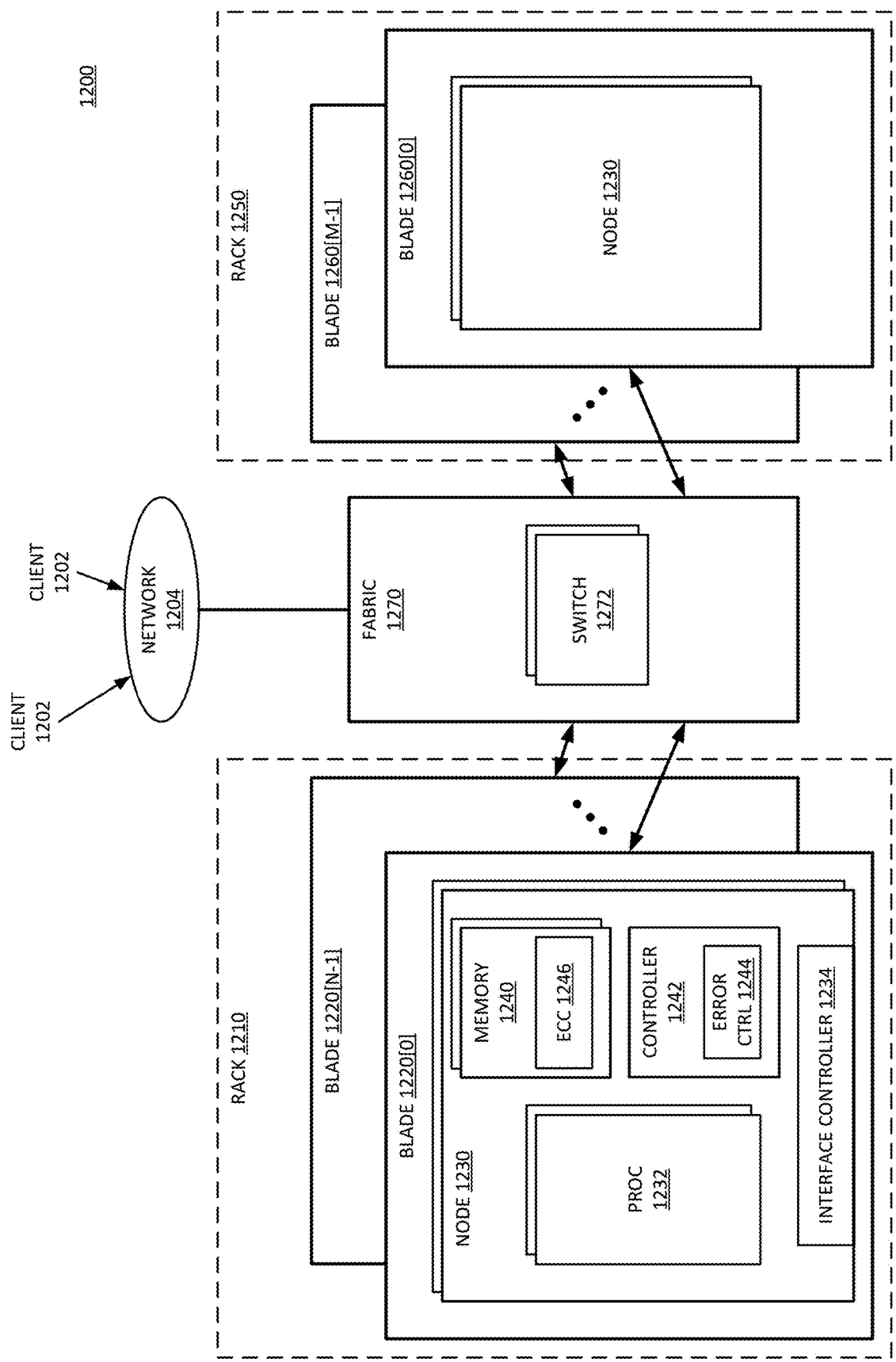
FIG. 12 is a block diagram of an example of a multi-node network in which selective sending of corrected data from on-memory ECC can be implemented.

FIG. 12 is a block diagram of an example of a multi-node network in which selective sending of corrected data from on-memory ECC can be implemented. System 1200 represents a network of nodes that can apply adaptive ECC. In one example, system 1200 represents a data center. In one example, system 1200 represents a server farm. In one example, system 1200 represents a data cloud or a processing cloud.

Nodes 1230 of system 1200 represent a system in accordance with an example of system 100 or system 200. Node 1230 includes memory 1240. Node 1230 includes controller 1242, which represents a memory controller to manage access to memory 1240. In one example, memory 1240 includes ECC 1246. ECC 1246 represents on-die ECC for memory 1240, to enable error checking and the selective providing of corrected data to memory controller 1242, in accordance with any example herein. In one example, memory controller 1242 includes error control 1244 to represent logic within memory controller 1242 to enable determination about whether to issue a subsequent read command to access corrected data. In one example, typically, memory 1240 provides uncorrected data to memory controller 1242 in response to a read command, performs error correction in parallel to providing the uncorrected data, and can provide the corrected data in response to a subsequent request by memory controller 1242.

One or more clients 1202 make requests over network 1204 to system 1200. Network 1204 represents one or more local networks, or wide area networks, or a combination. Clients 1202 can be human or machine clients, which generate requests for the execution of operations by system 1200. System 1200 executes applications or data computation tasks requested by clients 1202.

In one example, system 1200 includes one or more racks, which represent structural and interconnect resources to house and interconnect multiple computation nodes. In one example, rack 1210 includes multiple nodes 1230. In one example, rack 1210 hosts multiple blade components 1220. Hosting refers to providing power, structural or mechanical support, and interconnection. Blades 1220 can refer to computing resources on printed circuit boards (PCBs), where a PCB houses the hardware components for one or more nodes 1230. In one example, blades 1220 do not include a chassis or housing or other "box" other than that provided by rack 1210. In one example, blades 1220 include housing with exposed connector to connect into rack 1210. In one example, system 1200 does not include rack 1210, and each blade 1220 includes a chassis or housing that can stack or otherwise reside in close proximity to other blades and allow interconnection of nodes 1230.

System 1200 includes fabric 1270, which represents one or more interconnectors for nodes 1230. In one example, fabric 1270 includes multiple switches 1272 or routers or other hardware to route signals among nodes 1230. Additionally, fabric 1270 can couple system 1200 to network 1204 for access by clients 1202. In addition to routing equipment, fabric 1270 can be considered to include the cables or ports or other hardware equipment to couple nodes 1230 together. In one example, fabric 1270 has one or more associated protocols to manage the routing of signals through system 1200. In one example, the protocol or protocols is at least partly dependent on the hardware equipment used in system 1200.

As illustrated, rack 1210 includes N blades 1220. In one example, in addition to rack 1210, system 1200 includes rack 1250. As illustrated, rack 1250 includes M blades 1260. M is not necessarily the same as N; thus, it will be understood that various different hardware equipment components could be used, and coupled together into system 1200 over fabric 1270. Blades 1260 can be the same or similar to blades 1220. Nodes 1230 can be any type of node and are not necessarily all the same type of node. System 1200 is not limited to being homogenous, nor is it limited to not being homogenous.

For simplicity, only the node in blade 1220[0] is illustrated in detail. However, other nodes in system 1200 can be the same or similar. At least some nodes 1230 are computation nodes, with processor (proc) 1232 and memory 1240. A computation node refers to a node with processing resources (e.g., one or more processors) that executes an operating system and can receive and process one or more tasks. In one example, at least some nodes 1230 are server nodes with a server as processing resources represented by processor 1232 and memory 1240. A storage server refers to a node with more storage resources than a computation node, and rather than having processors for the execution of tasks, a storage server includes processing resources to manage access to the storage nodes within the storage server.

In one example, node 1230 includes interface controller 1234, which represents logic to control access by node 1230 to fabric 1270. The logic can include hardware resources to interconnect to the physical interconnection hardware. The logic can include software or firmware logic to manage the interconnection. In one example, interface controller 1234 is or includes a host fabric interface, which can be a fabric interface in accordance with any example described herein.

Processor 1232 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 1240 can be or include memory devices and a memory controller.

In general with respect to the descriptions herein, in one example a memory device includes: a memory array; a hardware interface to couple to a memory controller; and error checking and correction (ECC) circuitry to receive read data from an address of the memory array in response to a read command from the memory controller, perform error checking on the read data, return an indication of errors detected in the read data, return the read data without application of error correction, apply error correction to the read data, and store corrected read data internally to the memory device.

In an example of the memory device, the ECC circuitry is to store the corrected read data in a buffer of the memory device. In any preceding example of the memory device, the ECC circuitry is to store the corrected read data in a register accessible to the memory controller. In any preceding example of the memory device, the indication comprises an indication of a correctable, uncorrected error in the read data. In any preceding example of the memory device, the indication comprises an encoding of error reporting metadata. In any preceding example of the memory device, the hardware interface is to receive a subsequent read command for the corrected read data, and return the corrected read data in response to the subsequent read command for the corrected read data. In any preceding example of the memory device, the read command for the corrected read data comprises a subsequent read command to the address of the memory array. In any preceding example of the memory device, the memory device includes: a register to store an address of the read command, wherein in response to a subsequent read command with a subsequent address, and provide the corrected read data when the subsequent address and the stored address match. In any preceding example of the memory device, the memory device comprises a synchronous dynamic random access memory (SDRAM) device compatible with a double data rate (DDR) standard.

In general with respect to the descriptions herein, in one example a memory controller includes: a hardware interface to couple to a memory device; and command logic to generate a read command to an address of the memory device; wherein in response to the read command, the hardware interface is to receive data from the address without application of on-die error correction by error checking and correction (ECC) circuitry of the memory device and an indication of a correctable, uncorrected error in the data; and wherein in response to the indication of the correctable, uncorrected error in the data, the command logic is to generate a subsequent read command to receive the data from the address with application of on-die error correction by the ECC circuitry of the memory device.

In an example of the memory controller, the indication comprises an encoding of error reporting metadata. In any preceding example of the memory controller, the subsequent read command comprises a read command to the address. In any preceding example of the memory controller, the subsequent read command comprises a read command to a register accessible by the memory controller. In any preceding example of the memory controller, the hardware interface is to couple to multiple memory devices in parallel, and the memory controller further includes: host ECC circuitry to perform error checking on data received from the multiple memory devices; wherein the host ECC circuitry is to perform error correction for a single bit error (SBE) for data received from the multiple memory devices, and generate the subsequent read command to receive the data from the address with application of on-die error correction by the ECC circuitry of the memory devices in response to a multibit error (MBE) in the data received from the multiple memory devices.

In general with respect to the descriptions herein, in one example a system includes: a memory device including: a memory array; and error checking and correction (ECC) circuitry to receive read data from an address of the memory array, perform error checking on the read data, return an indication of errors detected in the read data, return the read data without application of error correction, apply error correction to the read data, and store corrected read data internally to the memory device; and a memory controller including: command logic to generate a read command to the address of the memory device; wherein in response to the read command, the memory device is to return the read data without application of error correction and the indication of errors detected in the read data.

In an example of the system, the ECC circuitry is to store the corrected read data in a buffer of the memory device, or in a register accessible to the memory controller. In any preceding example of the system, the indication comprises an indication of a correctable, uncorrected error in the read data, wherein the indication comprises an encoding of error reporting metadata. In any preceding example of the system, the indication comprises an indication of a correctable, uncorrected error in the read data, wherein the memory controller is to send a subsequent read command for the corrected read data, the memory device to return the corrected read data in response to the subsequent read command for the corrected read data. In any preceding example of the system, the memory device further includes: a register to store an address of the read command, wherein in response to a subsequent read command with a subsequent address, and provide the corrected read data when the subsequent address and the stored address match. In any preceding example of the system, the system further includes one or more of: a host processor device coupled to the memory controller; a display communicatively coupled to a host processor; a network interface communicatively coupled to a host processor; or a battery to power the system.

In general with respect to the descriptions herein, in one example a method includes: receiving read data from an address of a memory array at error checking and correction (ECC) circuitry of a memory device in response to a read command from a memory controller; performing error checking on the read data; returning an indication of errors detected in the read data; returning the read data without application of error correction; applying error correction to the read data; and storing corrected read data internally to the memory device.

In an example of the method, storing comprises storing the corrected read data in a buffer of the memory device. In any preceding example of the method, storing comprises storing the corrected read data in a register accessible to the memory controller. In any preceding example of the method, returning the indication comprises returning an indication of a correctable, uncorrected error in the read data. In any preceding example of the method, returning the indication comprises returning an encoding of error reporting metadata. In any preceding example of the method, the method includes receiving a subsequent read command for the corrected read data; and returning the corrected read data in response to the subsequent read command for the corrected read data. In any preceding example of the method, receiving the subsequent read command for the corrected read data comprises receiving a subsequent read command to the address of the memory array. In any preceding example of the method, the method includes: storing an address of the read command in a register, wherein in response to receiving a subsequent read command with a subsequent address; and providing the corrected read data when the subsequent address and the stored address match. In any preceding example of the method, the memory device comprises a synchronous dynamic random access memory (SDRAM) device compatible with a double data rate (DDR) standard.

In general with respect to the descriptions herein, in one example a computer-readable storage medium includes instructions stored thereon, which when executed by a processor cause the processor to execute a method in accordance with any example of the preceding two paragraphs.

In general with respect to the descriptions herein, in one example a method includes: generating a read command to an address of a memory device from a memory controller; in response to the read command, receiving data from the address without application of on-die error correction by error checking and correction (ECC) circuitry of the memory device and receiving an indication of a correctable, uncorrected error in the data; and in response to the indication of the correctable, uncorrected error in the data, generating a subsequent read command to receive the data from the address with application of on-die error correction by the ECC circuitry of the memory device.

In an example of the method, receiving the indication comprises receiving an encoding of error reporting metadata. In any preceding example of the method, generating the subsequent read command comprises sending a read command to the address. In any preceding example of the method, generating the subsequent read command comprises sending a read command to a register accessible by the memory controller. In any preceding example of the method, wherein the memory device is one of multiple memory devices coupled in parallel to the memory controller, and the method further includes: performing error checking on data received from the multiple memory devices with host ECC circuitry; wherein the host ECC circuitry performs error correction for a single bit error (SBE) for data received from the multiple memory devices; and generates the subsequent read command to receive the data from the address with application of on-die error correction by the ECC circuitry of the memory devices in response to a multibit error (MBE) in the data received from the multiple memory devices.

In general with respect to the descriptions herein, in one example a computer-readable storage medium includes instructions stored thereon, which when executed by a processor cause the processor to execute a method in accordance with any example of the preceding two paragraphs.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory device comprising:
a memory array;
a hardware interface to couple to a memory controller; and
error checking and correction (ECC) circuitry to receive read data from an address of the memory array in response to a read command from the memory controller, perform error checking on the read data, detect a severity of error in the read data, encode an indication of errors to indicate the severity of error including a selection among no errors, corrected error, and uncorrected error, return the indication of errors, return the read data without application of error correction, apply error correction to the read data, and store corrected read data internally to the memory device.

2. The memory device of claim 1, wherein the ECC circuitry is to store the corrected read data in a buffer of the memory device.

3. The memory device of claim 1, wherein the ECC circuitry is to store the corrected read data in a register accessible to the memory controller.

4. The memory device of claim 1, wherein the indication comprises an indication of a correctable, uncorrected error in the read data.

5. The memory device of claim 4, further comprising the hardware interface to receive a subsequent read command for the corrected read data, and return the corrected read data in response to the subsequent read command for the corrected read data.

6. The memory device of claim 5, wherein the read command for the corrected read data comprises a subsequent read command to the address of the memory array.

7. The memory device of claim 1, further comprising:
a register to store an address of the read command, wherein in response to a subsequent read command with a subsequent address, and provide the corrected read data when the subsequent address and the stored address match.

8. The memory device of claim 1, wherein the memory device comprises a synchronous dynamic random access memory (SDRAM) device compatible with a double data rate (DDR) standard.

9. A memory controller comprising:
a hardware interface to couple to a memory device; and
command logic to generate a read command to an address of the memory device;

wherein in response to the read command, the hardware interface is to receive data from the address without application of on-die error correction by error checking and correction (ECC) circuitry of the memory device and an encoded indication of errors to indicate a severity of error in the data including a selection among no errors, corrected error, and uncorrected error; and wherein in response to the indication of errors indicating a correctable, uncorrected error in the data, the command logic is to generate a subsequent read command to receive the data from the address with application of on-die error correction by the ECC circuitry of the memory device.

10. The memory controller of claim 9, wherein the subsequent read command comprises a read command to the address.

11. The memory controller of claim 9, wherein the subsequent read command comprises a read command to a register accessible by the memory controller.

12. The memory controller of claim 9, wherein the hardware interface is to couple to multiple memory devices in parallel, and further comprising:

host ECC circuitry to perform error checking on data received from the multiple memory devices;

wherein the host ECC circuitry is to perform error correction for a single bit error (SBE) for data received from the multiple memory devices, and generate the subsequent read command to receive the data from the address with application of on-die error correction by the ECC circuitry of the memory devices in response to a multibit error (MBE) in the data received from the multiple memory devices.

13. A system comprising:

a memory device including:
   a memory array; and
   error checking and correction (ECC) circuitry to receive read data from an address of the memory array, perform error checking on the read data, detect a severity of error in the read data, encode an indication of errors to indicate the severity of error including a selection among no errors, corrected error, and uncorrected error, return the indication of errors, return the read data without application of error correction, apply error correction to the read data, and store corrected read data internally to the memory device; and a memory controller including:
   command logic to generate a read command to the address of the memory device;
   wherein in response to the read command, the memory device is to return the read data without application of error correction and the indication of errors.

14. The system of claim 13, wherein the ECC circuitry is to store the corrected read data in a buffer of the memory device, or in a register accessible to the memory controller.

15. The system of claim 13, wherein the indication comprises an indication of a correctable, uncorrected error in the read data.

16. The system of claim 13, wherein the indication comprises an indication of a correctable, uncorrected error in the read data, wherein the memory controller is to send a subsequent read command for the corrected read data, the memory device to return the corrected read data in response to the subsequent read command for the corrected read data.

17. The system of claim 13, the memory device further comprising:
   a register to store an address of the read command, wherein in response to a subsequent read command with a subsequent address, and provide the corrected read data when the subsequent address and the stored address match.

18. The system of claim 13, further comprising one or more of:
   a host processor device coupled to the memory controller;
   a display communicatively coupled to a host processor;
   a network interface communicatively coupled to a host processor; or
   a battery to power the system.

* * * * *